Figure 1:
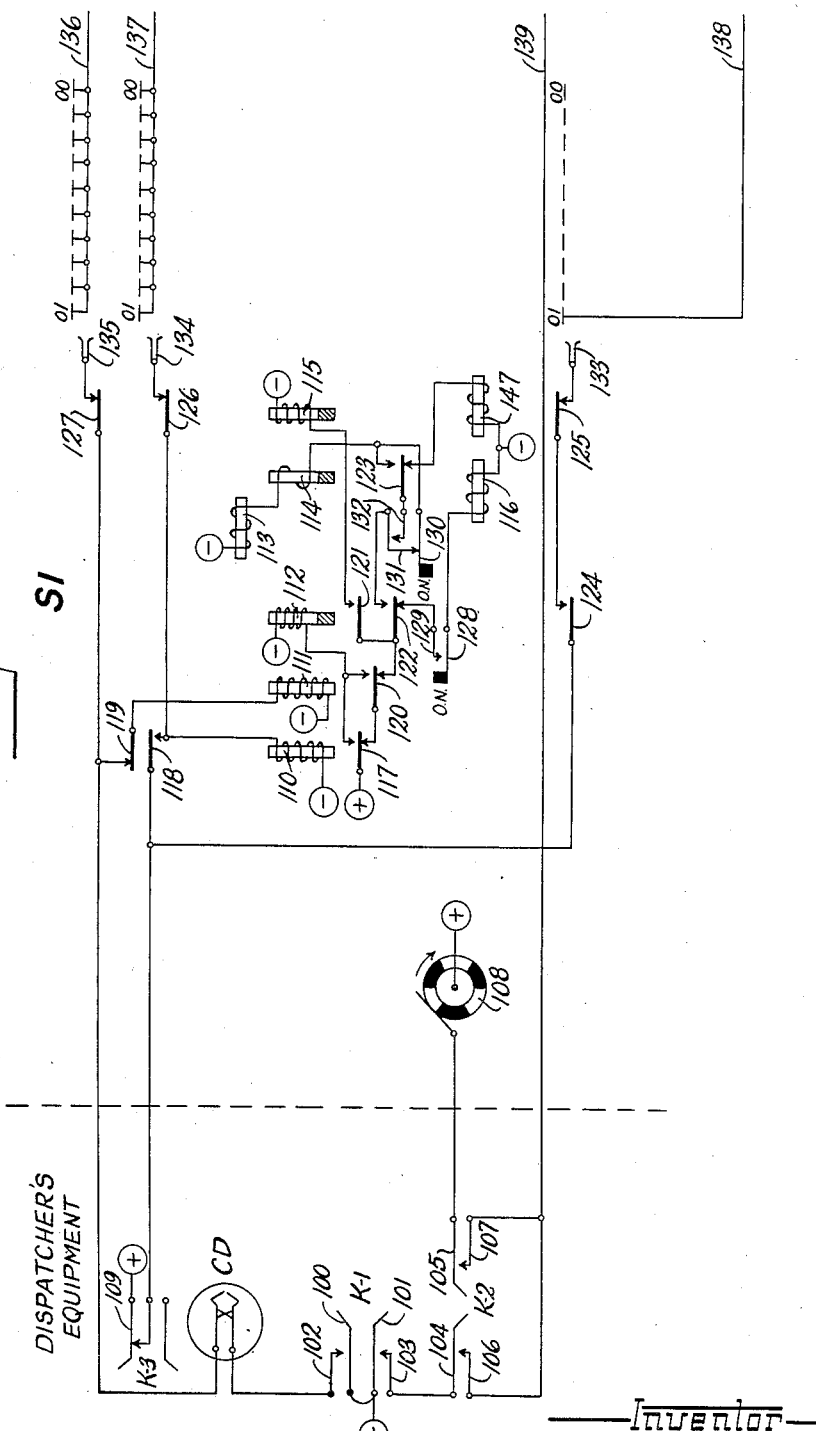

Aug. 6, 1935.  T. U. WHITE  2,010,339
DISPATCHER'S CONTROL BOARD SYSTEM
Original Filed Feb. 13, 1930  8 Sheets-Sheet 1

Inventor
Thomas U. White

Aug. 6, 1935.                    T. U. WHITE                    2,010,339
                      DISPATCHER'S CONTROL BOARD SYSTEM
                Original Filed Feb. 13, 1930    8 Sheets-Sheet 2

Inventor
Thomas U. White
Wm Walter Owen  Atty.

Aug. 6, 1935.   T. U. WHITE   2,010,339
DISPATCHER'S CONTROL BOARD SYSTEM
Original Filed Feb. 13, 1930   8 Sheets-Sheet 3

Fig. 3

Inventor
Thomas U. White

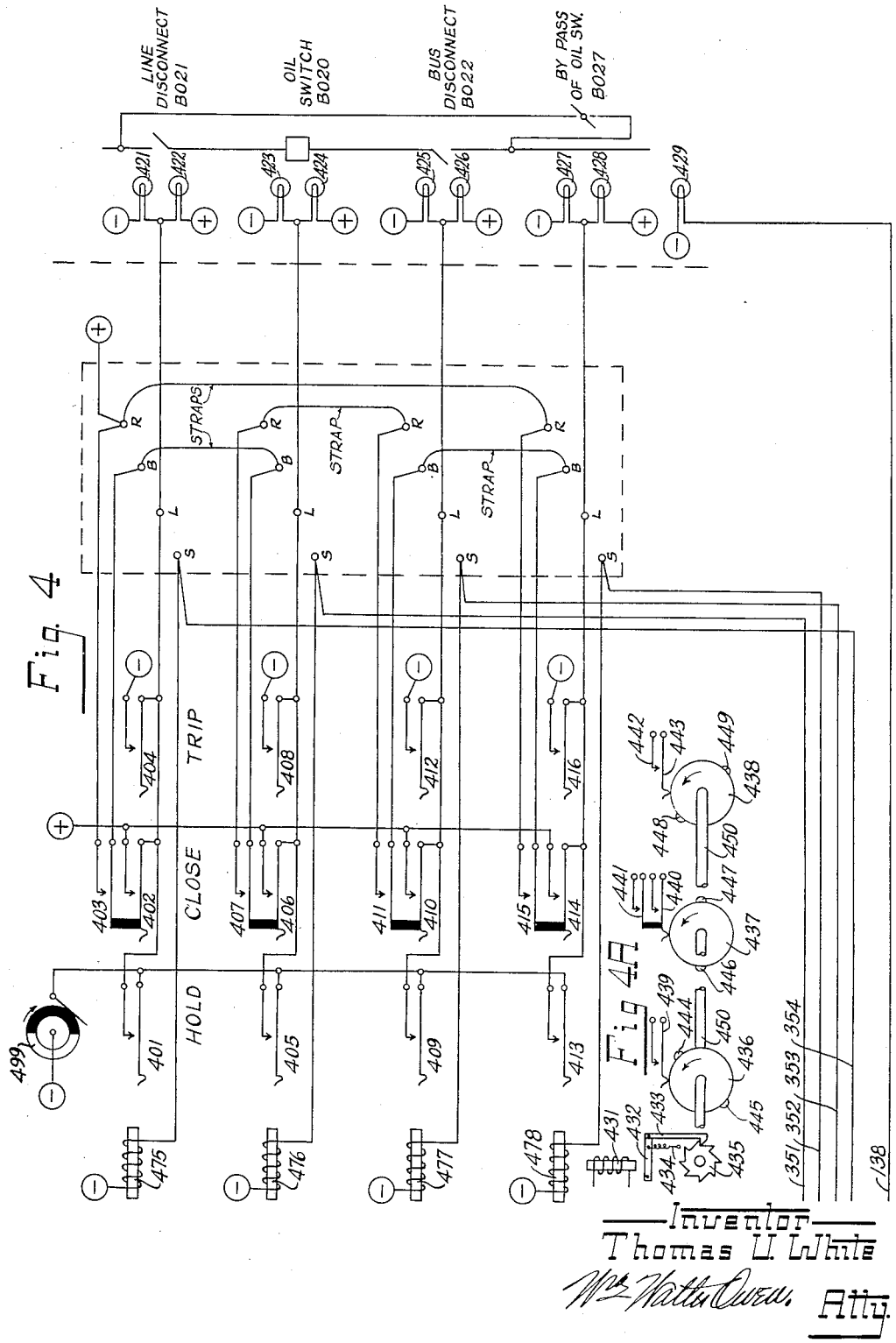

Aug. 6, 1935.  T. U. WHITE  2,010,339

DISPATCHER'S CONTROL BOARD SYSTEM

Original Filed Feb. 13, 1930   8 Sheets-Sheet 5

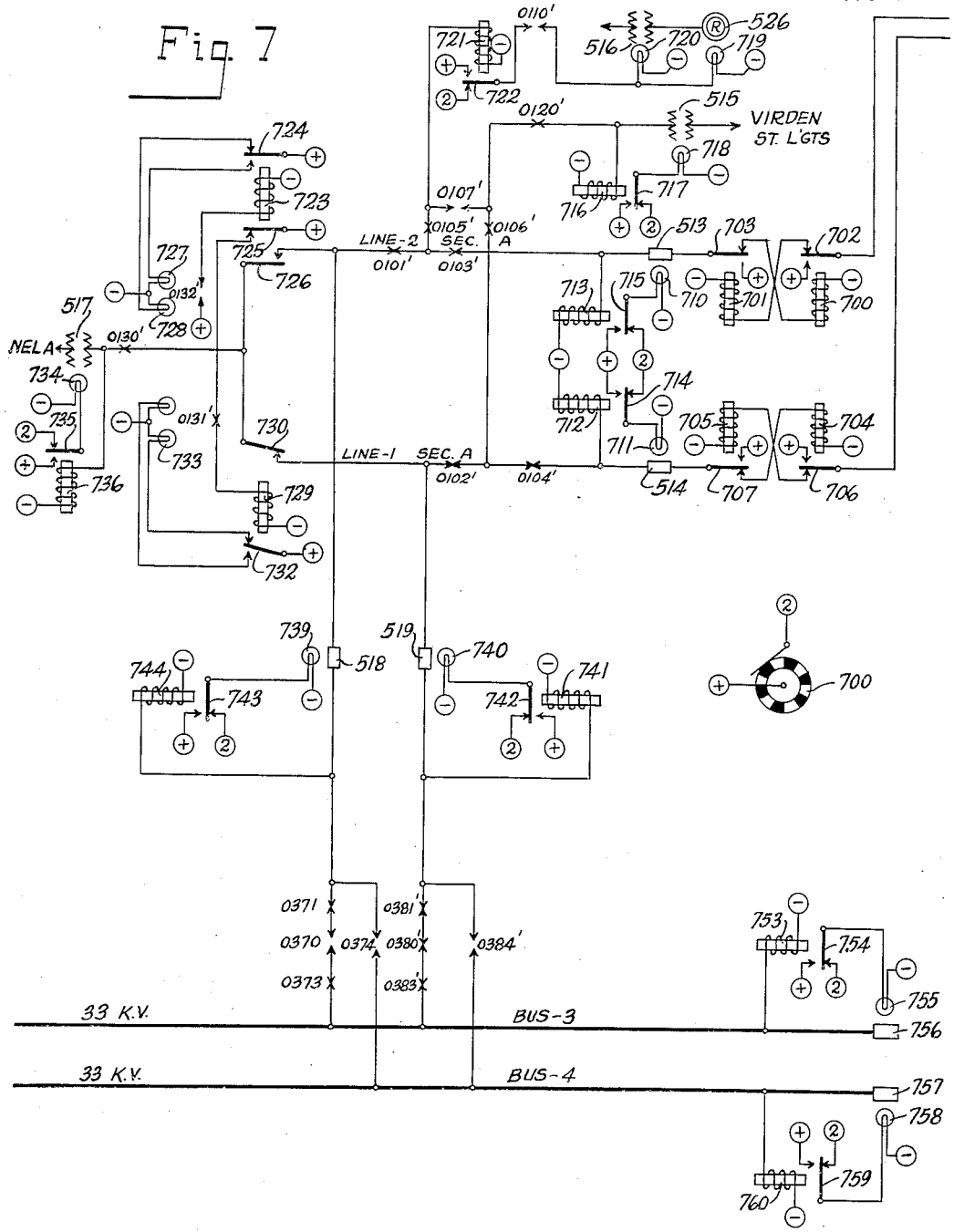

Aug. 6, 1935.   T. U. WHITE   2,010,339
DISPATCHER'S CONTROL BOARD SYSTEM
Original Filed Feb. 13, 1930   8 Sheets-Sheet 8
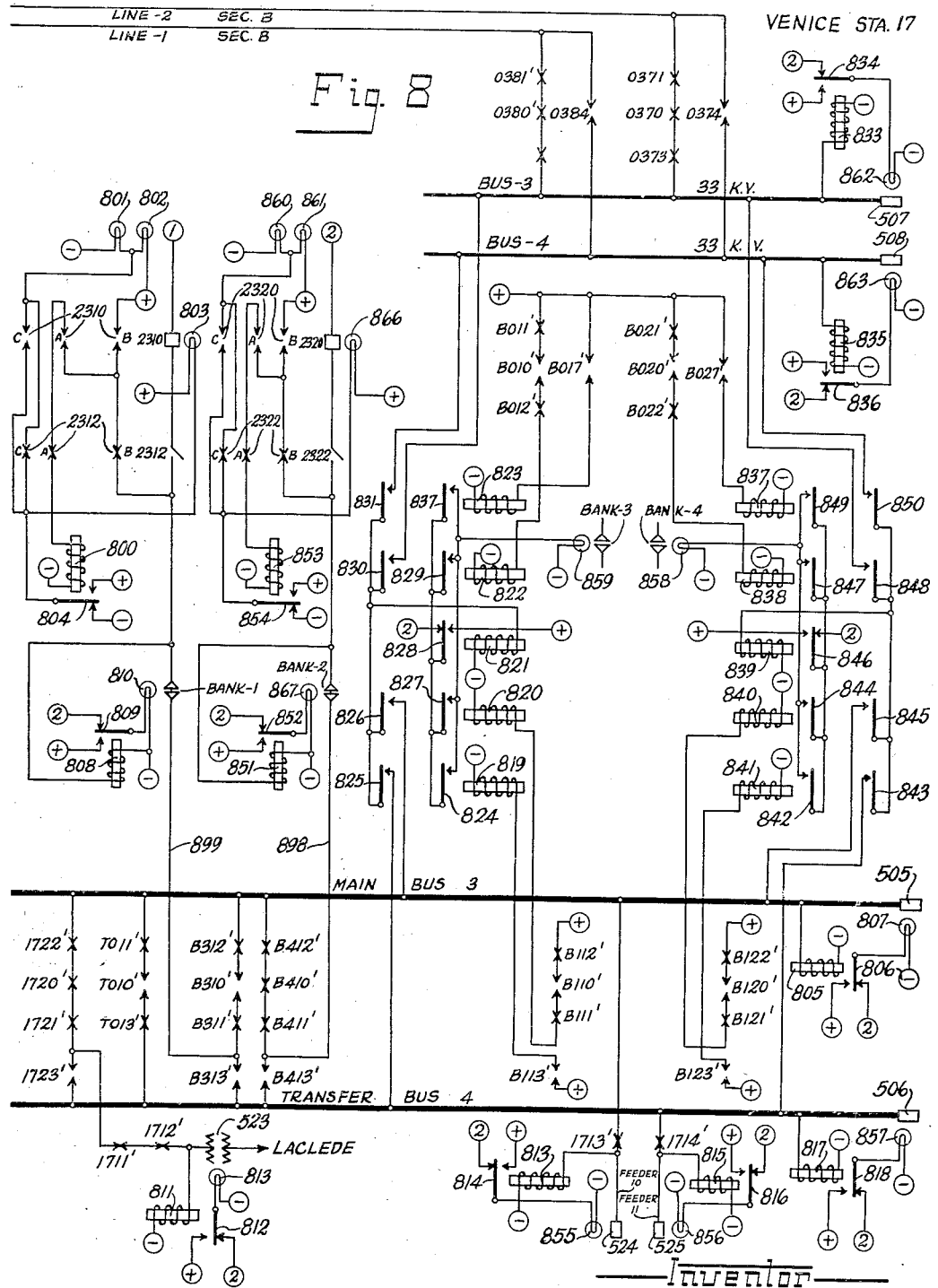

Patented Aug. 6, 1935

2,010,339

UNITED STATES PATENT OFFICE 2,010,339

DISPATCHER'S CONTROL BOARD SYSTEM

Thomas U. White, Chicago, Ill., assignor, by mesne assignments, to Associated Electric Laboratories, Inc., Chicago, Ill., a corporation of Delaware Application February 13, 1930, Serial No. 428,023
Renewed January 16, 1935

7 Claims. (Cl. 177—311)

My invention relates in general to centralized board systems and more particularly to that class now quite generally known as dispatcher's control board systems.

It is generally agreed that the most satisfactory method of operating an extensive system for the distribution of electrical energy, gas, water, or heat to a community is to direct the operation of a system of this character from a centralized dispatching or directing office. Probably the first utilities to recognize this fact and to centralize their dispatchers were those engaged in the distribution of electrical energy to furnish power and light to our various communities.

While this invention is particularly adaptable to a system of power distribution, its use is not limited thereto, and it is not improbable that with slight modifications it may in the near future be applied to systems of the other character mentioned.

The tendency towards centralized control has been brought about due to the necessity for coordinating the work of the various utility departments to effect the common purpose of continuity of service with the highest degree of human safety. What is true of the conditions affecting the distribution of electrical energy is also true of the conditions affecting the other utilities, such as gas, water, and heat. However, the demands of the community served is not so exacting on the other utilities as upon those engaged in the distribution of electrical energy. Hence, the first demand for systems of the character described in this invention lies in their application to the electric light and power industry.

The development of the oil circuit breaker, and the various motor operated switching devices, to a high degree of perfection, together with the development of a large variety of relay devices and systems for causing the automatic operation of switching equipment in a power system, has greatly complicated the circuit switching in a system of electrical distribution. It is, of course, possible to more or less accurately analyze the operation of such a system under varying conditions by a study of the wiring diagrams, but since one of the main problems of the utility department in control of the operation of a system for the distribution of electrical energy is to cut down the outage time due to the various faults and trouble conditions which may occur on the system, it is very desirable that some means be employed to enable the system dispatcher to more quickly analyze trouble conditions. In most cases, if the trouble condition is quickly analyzed, he may issue switching instructions to maintain continuity of service until the fault is cleared.

The old methods of analyzing the faults which might occur in a system of power distribution by consulting circuit diagrams is entirely too slow. The load dispatcher now requires some sort of complete signaling system, preferably one which can be conveniently operated, and by means of which he can maintain before him in a complete diagram, indications of the position of all elements under his control.

Circuit diagrams illustrating the connections of the various switching devices employed in the transmission and distribution of light and power are quite commonly laid out in a simplified manner by the use of a one-line diagram. The symbols used to represent the various switching units, and the method of connecting same has become quite standardized and the system dispatcher and those employed in the design and operation of power systems, now employ such diagrams in illustrating circuit connections throughout the system of distribution and transmission.

More recently satisfactory electric display boards or electrified system diagrams have been constructed for the use of the centralized load dispatcher. It is with this type of equipment that my invention deals. Many forms of dispatchers' diagrams have been constructed in the past and the centralized operator's quarters in almost every case employs some sort of diagram of the entire power system intended to reinforce the system dispatcher's memory and to assist him in the performance of this duty.

As used up to the present time the system dispatcher's diagram or display board has provided only a means for setting up indications of the position of the various switching elements and in some instances an indication as to the live or dead condition of transformers. In some cases colored plugs have been used, while in others lamp signals have been used and energized to indicate the position of equipment.

However, there now exists a need for a signalling system that goes considerably farther, and one that will automatically indicate the effect of the operation of the various switching elements, when connected in various circuit combinations in a system for the distribution of electrical energy. My invention provides a system of this character.

By means of the circuits and the equipment used in practicing the invention I have succeeded in constructing a mimic power system to some extent, in that, I have included in conjunction with means for electrifying the one-line diagram, a scheme for duplicating the operating set-up of the various switching elements used in the system. In addition I have provided means automatically operative to indicate when current is flowing through transformers, to the various trunk conductors, and over the various transmission lines of the system. I have also provided means for automatically indicating to the dispatcher when a transformer, a bus, a line, or a feeder, etc. has lost energy, due to the operation of any switch or generating unit in the system. It is still necessary, of course, to manually set up the indication of the operation of the switching element, since the control board, as described herein is not connected in any way with the actual physical equipment.

One object of the invention is to provide in a signalling system circuit means for electrifying a one-line diagram so that the effect to the circuits of the one-line diagram is comparable to the effect to the actual power system caused by the operation of the various switching elements used in the construction of the actual system.

Another object of the invention is to provide a one-line diagram of connections through switching devices which is electrified on a low voltage basis in a manner to provide tell-tale and guiding indications comparable to the effect to the power system caused by the operation of the physical switching equipment comprising the system of electrical distribution.

Another object of the invention is to provide an electrified one-line diagram which will include circuit means of setting up all of the signalling indications required on a system of this character, which in turn will automatically give an accurate indication of the condition of the various lines, busses, feeders, transformers, generators, rotaries, etc.

It is considered essential to the successful operation of the system of electrical distribution that the various switch elements in the system be given a designation which will indicate the type of function in the circuit, and that the designation on the switching elements indicative of their location and the work they are to perform in sectionalizing or protecting the system of transmission and distribution. It is an object of this invention to provide a selective control circuit of a type which will permit selecting and controlling the signals on a one-line diagram, when the signals are designated the same as the actual physical equipment in the power system.

The above and other less important objects of the invention will be brought out in the detailed description which follows:

In the drawings Figs. 1 to 8, inclusive, which form a part of this specification, sufficient apparatus and circuits are shown to enable my invention to be understood from the description given herein.

Referring now more particularly to the drawings, Figs. 1 to 4, inclusive, diagrammatically illustrate a method of and apparatus used for selecting the signals on the one-line diagram and the method and apparatus for then selectively controlling the selected signals.

In Fig. 5 a portion of the one-line diagram of a typical power circuit is shown, with a dictionary for the symbols used in the one-line diagram.

As indicated by the cross lines shown in Fig. 5, the one-line diagram is laid out in a sort of checker-board manner. The actual construction of a board of this kind consists of a number of interchangeable signal panels on which are mounted interchangeable escutcheons which may be blank, embossed to represent circuits or lamp signals equipped as required. The face equipment on which the one-line diagram is painted is preferably of the general type of that disclosed in my co-pending application, Serial No. 425,121, filed February 1, 1930.

The lamp signal units used to represent the various switches in the one-line diagram consist of a lamp jack assembly that holds colored lamps, mounted so the tips of the lamps meet directly behind a molded raised glass lens, molded in the form to correspond to standard symbols for oil switches, disconnect switches, air brake switches, motor operated disconnects, transformers, etc., substantially as shown in the co-pending application formerly referred to.

The various lamp signals are connected to individual controlling devices of the notching-relay type, hereinafter described in this specification, by means of cross-connecting wires, run through terminal strips in a manner similar to that used in telephone exchange distributing frames. This arrangement provides for connecting any signal to any control circuit by shifting jumpers or cross-connecting wires.

The selective apparatus and the relays used in electrifying the one-line diagram are usually energized from a forty-eight volt storage battery, while the lamps are usually energized on alternating current obtained through a step-down transformer from the 110 or 220 volt supply. In the present disclosure all current connections are symbolically indicated positive or negative.

Figure 6:
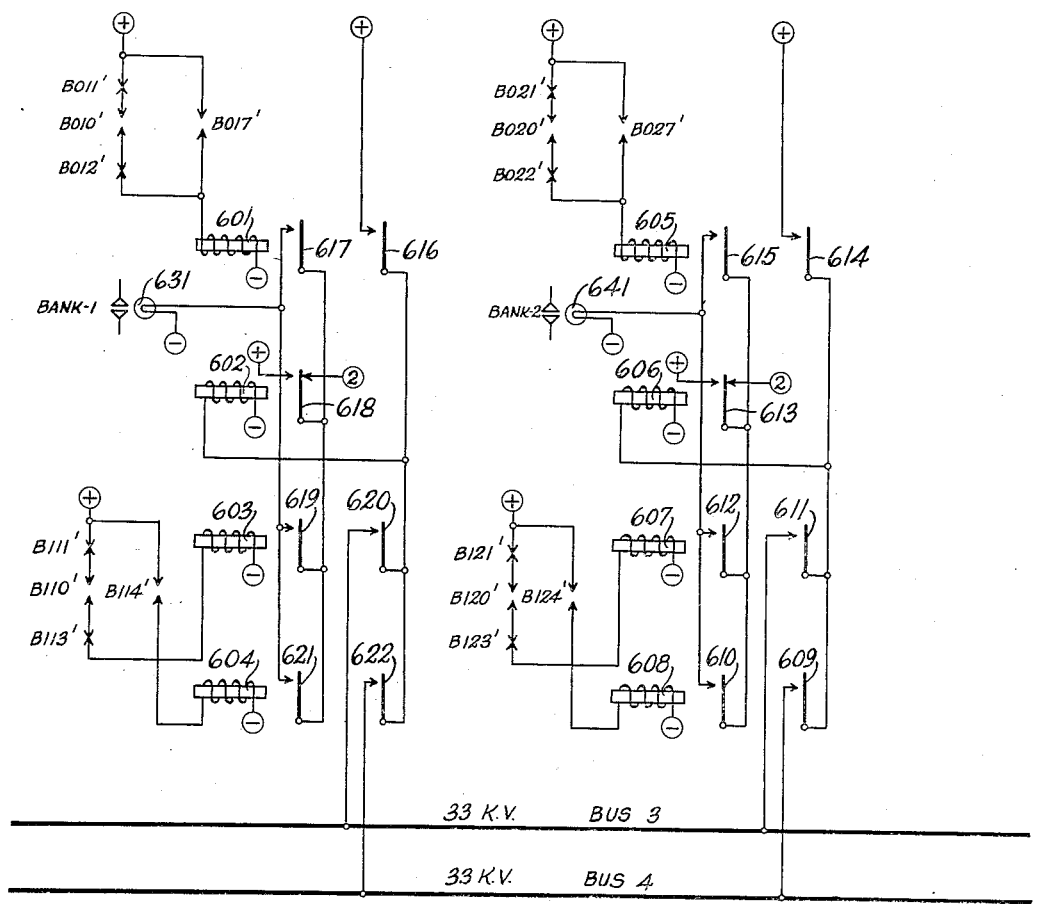

Figs. 6 to 8, inclusive, of the drawings illustrate the circuits and apparatus used in electrifying the one-line diagram so as to provide appropriate tell-tale and guiding indications and to reproduce a symbolic representation of the power system and its operation.

In practicing my invention, the switch symbols representing power switching equipment, as shown in the one-line diagram, Fig. 5, are arranged to be controlled by circuits completed by cam actuated spring contacts on a notching relay device. A device of this character is illustrated diagrammatically in Fig. 4. The mechanical construction of this device may be similar to that described in the pending United States application of Riebe and others, Serial No. 391,326, filed September 9, 1929.

The cam actuated spring contacts on the notching relay devices also control the tell-tale signalling indications and the relay circuits used in electrifying the one-line diagram as a mimic power system, the circuits of which are shown in Figs. 6 to 8, inclusive.

The notching relay devices are controlled by an electromagnet, such as 431 shown in Fig. 4A. Means are provided for selectively associating any one of a plurality of such electromagnets, which control the notching relay devices, with the dispatcher's controlling devices.

The operator's equipment consists of the calling device CD and keys K1, K2, and K3 shown in Fig. 1. By the use of these keys and the calling device, the dispatcher may actuate the selector switches, such as S1 in Fig. 1; S2 in Fig. 2; and S3 in Fig. 3; and associated relay circuits in such manner as to associate the circuits of the controlling key, such as K2 with any one of a plurality of notching relay devices.

The dispatcher closes the key K1 to connect the calling device CD to the circuits of the first selector S1, as shown in Fig. 1. The selecting devices S, S2, and S3, are similar to those commonly used in the automatic telephone art and are actuated by impulses transmitted from the calling device, such as CD located at the operator's position.

Having selected the desired notching relay as indicated by its associated signal circuits on the face equipment of the dispatcher's control board, the dispatcher may operate the notching relay device to set up the desired lamp signal indication on the switch symbols.

As a result of auxiliary circuits completed by the notching relay device used in setting up the signal indication, the tell-tale circuits illustrated in Figs. 6 to 8, inclusive, are operative to indicate the effect on the one-line diagram of the switching operation.

In order to facilitate the interconnection of the auxiliary circuits of the notching relay devices and to simplify the connection between the notching relay devices and the lamp symbols, the wiring from the notching relay devices is terminated on a terminal strip as shown diagrammatically in Fig. 4. The terminals designated "L" are arranged for cross connection to any desired lamp signal unit mounted in the face equipment of the board. The terminals designated "S" are arranged for cross connection to the selective equipment in order that any notching relay device may be associated with selective bank contacts or relay contacts to make possible changes of numbers on the switch symbols at will. The terminals B and R at the terminal block are those required for the operation of the circuits such as shown in Figs. 6 to 8, inclusive, and are so terminated in order to permit the strapping together of certain circuits, and to facilitate the connection of the circuits of the notching relays to other relay circuits as shown in Figs. 6 to 8, inclusive.

The terminal arrangement as shown in Fig. 4 is usually mounted on the rear equipment of the dispatcher's control board. The designations as shown on the terminal strip in Fig. 4 are given for purposes of explaining the method of interconnecting apparatus, but will not be used in connection with the explanation of the operation of the circuits involved.

Figure 2:
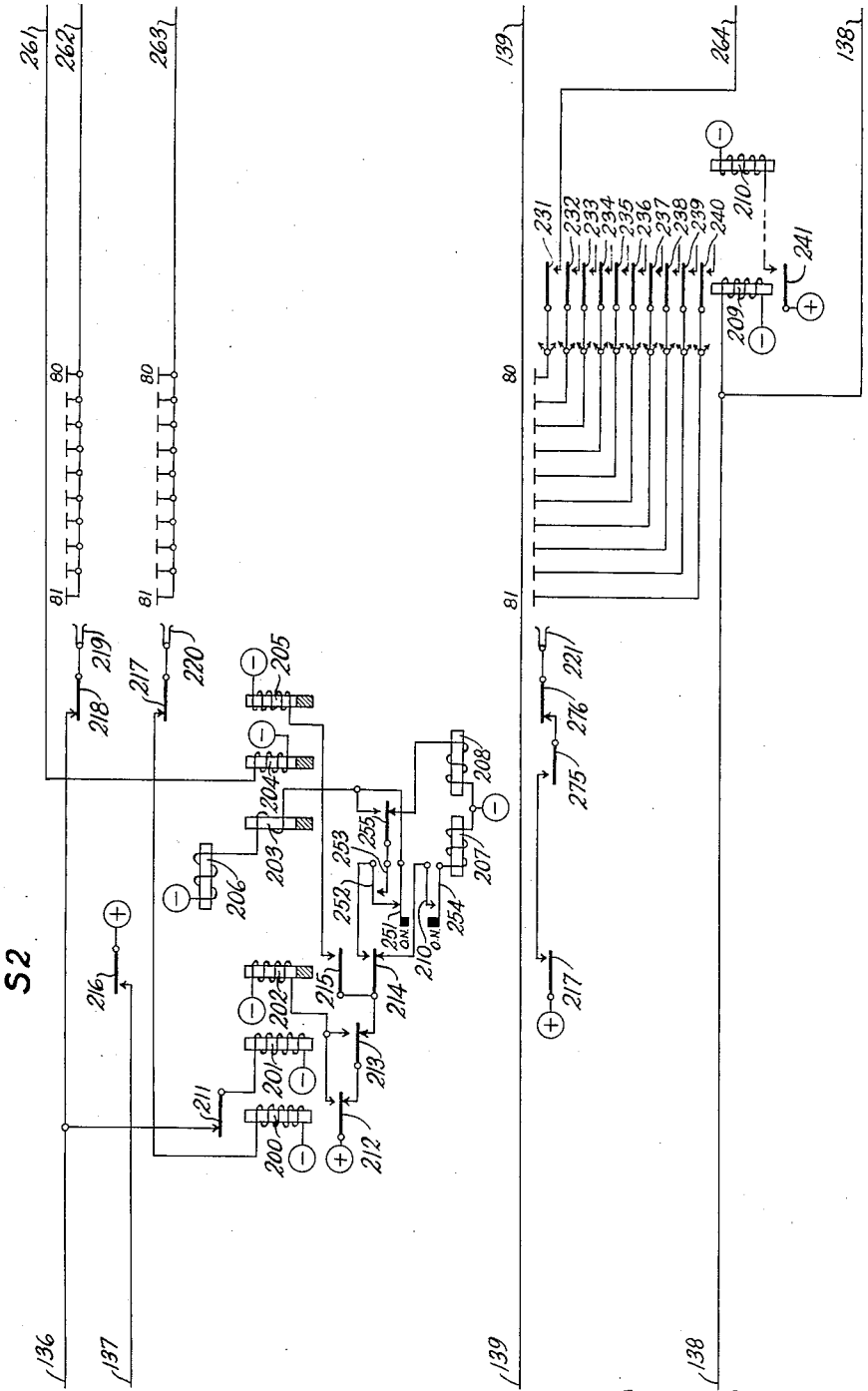

For purposes of illustrating the operation of the selecting circuits, and the signalling circuits used in setting up the various signal indications on the dispatcher's control board, the complete circuit connections used in setting up the signals on the symbols B020, B021, B022, and B027, in station 01 as shown on the face equipment, Fig. 5, have been illustrated in Fig. 4. As previously stated, the apparatus and circuits for selecting the notching relay signalling devices are shown in Figs. 1, 2, and 3.

The signal indications that are chosen to represent the position and the condition of the various switching elements represented on the one-line diagram, depends to some extent on the type of transmission and distribution system in connection with which the dispatcher's control board is employed. It will be understood from the explanation of the operation of the signalling circuits, as hereinafter described, that almost any desired combination of signalling indications may be used in practicing the invention.

For the purpose of illustrating this invention in connection with the signalling circuits for the one-line diagram shown in Fig. 5, the circuits have been arranged so that when a switch symbol on the one-line diagram is illuminated steady red the switch is in its closed position; when the symbol is illuminated steady green the switch is in its opened or tripped position; and when the switch symbol is illuminated by a flashing green the switch is in the "opened and blocked" or "hold" position.

The dispatcher has general supervision over all work in progress and he authorizes the operation of all switching equipment necessary to permit work on lines or physical equipment, and orders the establishment of all blocking or "hold" conditions on equipment to prevent its movement without his authorization or clearance orders. This is essential to continuity of service and human safety.

It is not sufficient that the dispatchers have accurate knowledge of simply the position of the various switching elements comprising the power network, but it is also imperative that he have accurate knowledge of the details of the switches used in giving clearances on lines, feeders, transformer banks, and such physical equipment of the system, to permit the repair or replacement of defective parts. He must have absolute control of all switching operations for the reason that, only in this manner can he maintain continuity of service and prevent outages due to underload or overload conditions affecting the system which may be the result of switching operations.

The dispatcher is responsible for the generation, transmission and distribution of the proper amount of power load. He computes the demand to be met, schedules it on his generating pieces and interconnections with other systems; ascertains that each station and interconnection will provide sufficient electrical capacity to carry the load, and that there will be sufficient reserve energy to compensate for the loss of the largest source of supply available. He must keep in mind the condition of plant equipment and their ability to carry loads.

It is, therefore, important that he have accurate information on transformers that are carrying loads or that are out of service, on rotaries that are energized from the transmission line or that are shut down, and that he have indications as to which generators are supplying energy to the system, those that are available for supplying energy to the system, but not in use, and those that are shut down for any reason, such as repairs or replacement of working parts.

This invention includes a means automatically operative to indicate the following condition of various circuits and equipment, as shown on the one-line diagram, Fig. 5.

(A) When a transformer symbol is illuminated with a steady red signal, the transformer is "live or hot" and in service. A flashing red signal on a transformer symbol indicates that the transformer is dead. When the symbol is dark on a transformer bank, the transformer is indicated as out of service.

(B) When the symbol which indicates a rotary converter is illuminated by the red lamp, the indication is that the rotary is being energized from the transmission line. A flashing red signal on the rotary symbol indicates a loss of energy on the rotary. When the rotary symbol is dark the indication is that the rotary has been shut down.

(C) When a line, bus, or feeder tell-tale signal is illuminated by a steady red lamp signal the indication is that the line, bus, or feeder is "live or hot". When the tell-tale symbol is illuminated by a flashing red lamp signal the indication is that the line, bus, or feeder is "dead or cold".

(D) When the generator symbol is illuminated by a steady red lamp signal the generator is supplying energy to the system. When the generator symbol is dark the indication is that the generator is shut down. When the generator symbol is illuminated by a clear or white lamp signal the indication is that the generator is available to supply energy to the system but is not in use.

Other indications may be required in connection with various types of transmission and distribution systems and it will be readily understood from the explanation of the operation of the circuits and apparatus as will be hereinafter described that the invention is not limited to the specific indications defined above. The main object of this invention is to provide a means of electrifying the system operator's one-line diagram in such manner that indications of this character will be automatically operative when the proper switching operations are performed and the proper signalling indications set up on the dispatcher's control board. All of the signalling indications used are automatically operated with the exception of those which indicate the open, closed, or the "hold" condition on the various switches indicated symbolically on the dispatcher's one-line diagram.

In the actual practice of the invention it is assumed that the dispatcher will set up signalling indications on the one-line diagram of the control board indicative of the operation that he expects to perform, in advance of issuing the instruction to the substation attendant for the actual operation of the switch. In this manner he checks the accuracy of his switching instruction.

It is further assumed that as soon as the dispatcher receives a report from the various field forces or substation attendants of the automatic operation of a switch, that he will immediately select the corresponding switch symbol on the dispatcher's control board and set up an indication indicative of the operation that has occurred.

If the dispatcher's control board is maintained up to the minute to correctly indicate through the medium of the illuminated symbols, the condition of the various switching elements in the power system, it will be understood from the description which follows that the invention includes an automatically operative means to indicate to the dispatcher the actual condition of the lines, busses, feeders, transformer banks, generating units, rotary converters, etc. comprising the transmission and distribution system, and further that means are included to minimize the possibility of incorrect switching operations, provided the dispatcher sets up signals on the control board indicative of the operation he proposes to perform in advance of the actual performance of said switching operation.

Referring now more particularly to Figs. 1 to 4, inclusive, the invention, as relating to the selection and operation of the signalling devices, will be described.

Let us assume that the dispatcher desires to illuminate the switch symbol B020 in station No. 01 with a steady red lamp signal to indicate that the oil switch B020 in station No. 01 is in its closed position.

The dispatcher first operates the cut-in key K1. As a result of this operation spring 100 makes contact with spring 102, and spring 100 connects with spring 103.

There is now a circuit completed which extends from positive battery at spring 101 and its contact 102, contacts of the calling device CD, back contact and armature 119, and the winding of relay 111 to negative battery. Relay 111 is energized over this path, and completes a circuit from positive battery at armature 117 and its back contact, armature 120 and its front contact, and the winding of relay 112 to negative battery. Relay 112, which is of the slow-to-release type, is energized over the path just traced. This relay will maintain its armatures attracted during the transmission of the impulses to the selector S1 by the operation of the calling device CD.

The selectors S1, S2, and S3 are of the vertical and rotary type commonly employed in the automatic telephone art. It is believed that the structure of these switches is too well understood to require a detailed explanation in connection with this application. The switch S1, illustrated in Fig. 1, has three sets of bank contacts arranged one hundred contacts to each bank. There are three wipers, such as 133 to 135, inclusive, associated with a common shaft which is arranged to be operated first vertically and then in a horizontal or rotary movement by the vertical and rotary magnets, respectively, when energized and deenergized by impulses from the calling device CD.

As a result of the energization of the relay 112, one point in the energizing circuit of the relay 115 is closed at armature 121 and its contact. At armature 122 and its front contact one point in the energizing circuit of the relay 114 and the vertical magnet 113 is closed. At armature 122 and its back contact one point in the energizing circuit of the release magnet 116 is opened to prevent the release of the switch mechanism so long as the relay 112 remains energized.

To select the switch symbol B020 in station 01 the dispatcher must dial six digits. The letter B of the switch designation is given an arbitrary value of eight impulses. The six digit number will, therefore, be 018020. The first two digits select the station, the second two digits select a switch group within the station, and the last two digits select a particular switch within the switch group.

With the selecting scheme used in practicing the invention it is possible to select any one of one hundred stations, and any one of one hundred switches that may be located in any one of one hundred groups of switches within each station. The selector S1 controls the station selection, selector S2 controls the group selection, and selector S3 controls the final switch symbol selection.

Since zero has the value of ten impulses, the calling device CD will open and close its contacts ten times in the transmission of the first digit.

Each time the contacts of the calling device are opened the relay 111 will be deenergized, and the relay will again be energized on each closure of the dial contacts.

When the relay 111 is deenergized on the first impulse, there is a circuit completed which extends from positive battery at armature 117 and its back contact, armature 120 and its back contact, armature 122 and its front contact, normally made off-normal contacts 130 and 131 and windings of the relay 114, and vertical magnet 113 in series to negative battery. The relay 114 and the vertical magnet 113 are energized over the path just traced. As a result of this operation the wiper shaft is raised one notch in its vertical movement to bring the wipers 133 to 135, inclusive, opposite the first level of their respective bank contacts.

As a further result of the deenergization of the relay 111, there is a circuit completed in parallel with that just traced which extends from positive battery at armature 117 and its back contact, armature 120 and its back contact, armature 121 and its contact, and the winding of relay 115 to negative battery. The relay 115, which is of the slow-to-release type, is energized over this path to maintain the wipers 133 to 135, inclusive, disconnected from the circuits of the calling device during the transmission of the impulses. It will be seen that the circuits of the wipers 133 to 135, inclusive, are opened at armatures 125 to 127, respectively, when the relay 115 is energized.

As a result of the operation of the wiper shaft from its normal position the off-normal contacts are actuated and spring 128 is moved into connection with its working contact 129, while the spring 131 is disconnected from spring 130 and connected to contact 132. Since the relay 114 is energized in series with the vertical magnet 113 at the time the operation of the off-normal springs takes place, there is now an auxiliary circuit completed via off-normal contacts 131, 132, and the armature 123, to continue the energization path of the relay 114 and the vertical magnet 113 during the transmission of the remaining impulses which comprise the first digit.

When the relay 111 is energized prior to the transmission of the second impulse by the calling device the vertical magnet positions its pawl and ratchet mechanism to cause the second vertical movement of the wiper shaft when the vertical magnet is again energized. The second operation of the vertical magnet results in another vertical movement of the wiper shaft to raise the shaft another notch and position the wipers 133 to 135, inclusive, opposite the second level of their respective bank contacts. The vertical magnet is energized and deenergized over the path just traced by each succeeding operation of the relay 111.

As a result of the operation of the vertical magnet in this manner in response to the ten impulses transmitted, as the first digit of the selected number, the wiper shaft is raised to position the wipers 133 to 135, inclusive, opposite the tenth level of their respective bank contacts.

The interval between the first and second impulse series is sufficiently long to allow the relay 114 to retract its armature 123.

When the relay 114 retracts its armature, it substitutes the rotary magnet 147 for the relay 114 and the vertical magnet 113.

To transmit the second digit of the required number the dispatcher dials the digit 1. When the relay 111 is deenergized by the operation of the calling device CD, there is a circuit completed which extends from positive battery at armature 117 and its back contact, armature 120 and its back contact, armature 122 and its front contact, off-normal contacts 131 and 132, armature 123 and its back contact, and the winding of the rotary magnet 147 to negative battery. The rotary magnet 147 is, therefore, energized over this path to operate its pawl and ratchet mechanism, and to move the wipers 133 to 135, inclusive, one step in the horizontal direction.

The relay 111 is again energized when the contacts on the calling device CD are closed at the end of the transmission of the second digit. As a result of the operation of the selector switch S1 in the manner just described, the wipers 133 to 135, inclusive, are brought to rest in engagement with the first contact set on the tenth level of their respective switch banks. Only the tenth level of bank contacts is shown in Fig. 1.

The energizing circuit of the relay 115 is opened at armature 120 during the interval between the second and third digit, and the time is sufficient to permit the slow acting relay 115 to retract its armatures 125 to 127, inclusive, and to complete the circuits which now pass through the wipers 133 to 135, inclusive.

As a result of the operation of the selector switch S1 in the manner described, there is a circuit completed which extends from positive battery at spring 100 of the key K1 and its contact 102, contacts of the calling device CD, armature 127 and its back contact, wiper 135, bank contact 01, conductor 136, back contact and armature 211, and the winding of relay 201 to negative battery. The relay 201 is energized over this path.

As a result of the operation of the selector switch S1 in the manner described, another circuit is completed which extends from positive battery at spring 108 of the key K3 and its contact, armature 124 and its contact, armature 125 and its contact, wiper 133, bank contact 01, and conductor 138, to the multi-contact relay 209 and filament of the pilot lamp signal 429 in multiple to negative battery. The station symbol 01 shown in Fig. 5 is illuminated by the lamp signal 429 over the path just traced to indicate to the dispatcher that he has selected the station 01 and that his selecting devices are in a position to select any switch within the station 01 by further operation of the calling device CD.

As one result of the energization of the relay 201 a circuit is completed from positive battery at armature 212 and its back contact, armature 213 and its front contact, and the winding of relay 202 to negative battery.

Upon the energization of the relay 202, a circuit is completed from positive battery at armature 216 and its front contact, conductor 137, bank contact and wiper 134, back contact and armature 126, and the winding of relay 110 to negative battery.

The relay 110 is energized over this path, and at armature 118 and its contact completes a holding circuit to maintain the relay 110 energized under control of the key K3.

As a further result of the energization of the relay 110, a circuit is completed from positive battery at armature 117 and its front contact, and the winding of relay 112 to negative battery. The relay 112 is now maintained energized under control of the relay 110, over the path just traced.

As a further result of the energization of the relay 110, the original energizing circuit of the relay 111 is opened at armature 119. Upon the deenergization of the relay 111, a point in the energizing circuit of the release magnet 116 is completed at armature 120 and its back contact. However, this circuit is without effect at this time due to its being open at armature 117.

Another result of the energization of the relay 202 in the manner described, one point in the energizing circuit of the relay 205 is completed at armature 215 and its contact, while at armature 214 and its contact a point in the energizing circuit for the relay 203 and the vertical magnet 206 is completed. These circuits are ineffective until the relay 201 is again deenergized.

The relay 209 was energized in parallel with the circuits traced for the energization of the pilot lamp signal 429. Ten relays, such as 209 and 210, may be energized as a result of the operation of the selector switch S1. When relay 209 is energized a circuit is closed at armature 241 and its contact for the energization of the relay 210. The dotted lines in the energizing circuit of relay 210, indicate that other relays may be energized in cascade prior to relay 210. Each one of these relays is of the multi-contact type and closes ten contact pairs to connect the energizing circuits of relays, such as 323 in Fig. 3 to the bank contacts of the selector switch S2 which are associated with the wiper 221. The relay 209 closes one point in the energizing circuit of relays such as 323.

When the dispatcher again operates the calling device CD to transmit the impulses comprising the third and fourth digits, the energizing circuit of the relay 201 is interrupted eight times on the third digit and ten times in the transmission of the fourth digit of the number being selected.

The operation of the selector switch S2 is similar to that described in connection with the selector switch S1.

When the relay 201 is deenergized on the first impulse, a circuit is completed which extends from positive battery at armature 212 and its back contact, armature 213 and its back contact, armature 215 and its contact, and the winding of relay 205 to negative battery. The relay 205 is energized over this path to maintain the wipers 219 to 221, inclusive, disconnected from all controlling circuits during the transmission of the impulses comprising the third and fourth digits.

As a further result of the deenergization of the relay 201 there is a circuit completed from positive battery at armature 212 and its back contact, armature 213 and its back contact, armature 214 and its front contact, off-normal contacts 252 and 251, the winding of relay 203 and vertical magnet 206 in series, to negative battery.

As a result of the energization of the vertical magnet 206, the wiper shaft of switch S2 is raised one step and the wipers are brought to a position opposite the first level of bank contacts.

As a result of the energization of relay 203 one point in the energizing circuit of the rotary magnet is opened at armature 255 and its back contact, while at the front contact of this armature an auxiliary circuit is completed for maintaining the energizing circuit of the vertical magnet 206 and the relay 204 connected to the circuit of the relay 201 during the transmission of the remaining impulses comprising the third digit. The relay 203 is of the slow-to-release type and will not retract its armature 255 during the rapid operation of the armature 213 in response to the remaining impulses of the third digit. As a result of the operation of the vertical magnet in response to the eight impulses transmitted by the calling device CD, the wiper shaft is raised to position its wipers opposite the eighth level of their respective bank contacts.

During the interval between the third and fourth impulse series, the relay 203 retracts its armature 255, as did the corresponding relay 114 of S1 in the operation of that switch. As a result the energizing circuits of the vertical magnet 206 and the relay 203 are opened at armature 255 and its front contact, and at the back contact of this armature closes one point in the energizing circuit of the rotary magnet 208.

Since zero has the value of ten impulses the fourth digit as transmitted by the calling device CD will result in the energization of the rotary magnet 208 to cause this magnet to operate the pawl and ratchet mechanism associated with the wiper shaft to rotate it ten steps into engagement with the tenth contact sets.

The impulses reach the rotary magnet over the path which extends from positive battery at armature 212 and its back contact, armature 213 and its back contact, armature 214 and its front contact, off-normal contacts 252 and 253, armature 255 and its back contact, and the winding of rotary magnet 208 to negative battery.

The relay 201 is maintained energized at the completion of the transmission of the impulses comprising the fourth digit. As a result, the energizing circuit of the relay 205 is maintained open at armature 213 and its back contact. Relay 205 retracts its armatures after a slight interval of time to close through the circuits associated with the wipers 219 to 221, inclusive.

Upon the deenergization of the relay 205, a circuit is completed from positive battery at the spring 100 of the key K1, working contact 102, contacts of the calling device CD, armature 127 and its contact, wiper 135 and the associated bank contact, conductor 136, back contact and armature 218, wiper 219 and its associated bank contact, conductor 262, and the winding of relay 301 to negative battery.

The relay 301 energizes and completes a circuit from positive battery at armature 313 and its front contact, and the winding of relay 302 to negative battery.

Upon the energization of the relay 302, a circuit is completed from positive battery through the contact and armature 216, conductor 263, bank contact and wiper 220, armature 217 and its contact, and the winding of relay 200 to negative battery.

Upon the energization of the relay 200, a circuit is completed at armature 212 to maintain the relay 202 energized under control of the relay 200. With the relay 202 maintained energized under the control of relay 200 which in turn is now controlled by the relay 302 in the selector switch S3, the selector S2 is maintained in position with the wipers 219 to 221, inclusive, resting on bank contacts 80 of their respective banks. Likewise, the selector switch S1 is maintained in an operated position with the wipers 133 to 135, inclusive, on the contacts 01 of their respective banks.

As a further result of the energization of the relay 209 a point in the original energizing circuit of the relay 201 is opened at armature 211.

The relay 201, therefore, deenergizes, and closes a point in the circuit of the release magnet 207, at its armature 213 and its back contact. This circuit is without effect at this time due to its being open at armature 212.

As a further result of the energization of the relay 302 in the manner described, one point in the energizing circuit of the relay 304 is completed at armature 314 and its contact, while at armature 315 and its front contact one point in the series energizing circuit of the vertical magnet 305 and the relay 303 is completed.

During the transmission of the fifth digit the energizing circuit of the relay 301 will be interrupted two times by the calling device CD. As a result the vertical magnet 305 will be energized two times to raise the wipers 321 and 322 opposite the second level of their associated bank contacts.

When the relay 301 is deenergized on the first digit, there is a circuit completed which extends from positive battery at armature 313 and its back contact, armature 315 and its front contact, spring contacts 311 and 310 of the off-normal switch, windings of the relay 303 and vertical magnet 305 in series to negative battery. The slow-to-release relay 303 and the vertical magnet 305 are energized over this path. As a result of the operation of the vertical magnet 305 the wiper shaft is raised one step.

As a result of the energization of the relay 303 one point in the energizing circuit of the rotary magnet is opened at armature 317 and its back contact. At armature 317 and its front contact an auxiliary path in the energizing circuit of the relay 303 and the vertical magnet 305 is closed.

As a result of the vertical movement of the wiper shaft the off-normal springs are operated in such manner that the contact between springs 310 and 311 is broken and a circuit is closed between contacts 311 and 312. Contacts 308 and 309 are closed at the same time to complete one point in the energizing circuit of the release magnet 307 which is without effect at this time due to the energized condition of the relay 302.

The relay 303 is of the slow-to-release type and will not retract its armature 317 during the transmission of the remaining impulses comprising the fifth digit. The energizing circuit of the relay 303 and the vertical magnet 305 is broken when the relay 301 remains energized at the end of the transmission of the first impulse series.

Because of the operation of the off-normal springs the remaining impulses comprising the fifth digit reach the vertical magnet over an auxiliary path which includes the contacts 311, 312 and armature 317 and its front contact instead of contact 310.

As a result of the operations of the vertical magnet 305 in the manner described the wiper shaft is raised two steps in its step-by-step vertical movement in such manner that the wipers 321 and 322 are brought to rest at a point opposite the second level of their associated bank contacts.

The relay 301 is maintained energized during the interval between the transmission of the fifth and sixth digit by the calling device CD. As a result, the energizing circuit of the relay 303 and the vertical magnet 305 is maintained opened at armature 313 and its back contact. The interval of time between the transmission of the fifth and sixth impulses by the operation of the calling device CD is sufficient to permit the relay 303 to retract its armature 317. As a result another point in the energizing circuit of the relay 303 and the vertical magnet 305 is opened at armature 317 and its front contact, while at the back contact of this same armature the energizing circuit of the rotary magnet 306 is prepared.

As a result of the operation of the relay 301 during the transmission of the impulses comprising the sixth and final digit, the rotary magnet 306 will be operated. Since the sixth digit has a value of ten impulses, the rotary magnet 306 will be energized and deenergized ten times in response to the operation of the relay 301 in the manner described.

As a result of this operation of the rotary magnet 306, the wiper shaft is operated ten rotary steps and the wipers 321 and 322 brought to rest on the tenth row bank contact sets in the second level of their respective banks.

Following the completion of the transmission of the sixth impulse series, the circuit of the slow-to-release relay 304 remains open at contacts 313, and this relay accordingly retracts its armatures 318 and 319. At armature 319 a circuit is completed from positive battery at the bank contact and wiper 321, armature 319 and its contact, conductor 261, and the winding of relay 204 to negative battery. Relay 204 energizes and completes a circuit from positive battery at armature 217 and its contact, over the contact and armature 275, back contact and armature 276, wiper 221 and its associated bank contact 69, armature 231 and its contact, conductor 264, and the winding of relay 323 to negative battery.

The relay 323 is of the multi-contact type having eleven sets of make contacts associated with its operating magnet. An energizing circuit is shown for a similar relay 324, which is energized due to circuits completed at armature 341. The dotted lines in the energizing circuit of 324, indicate that other relays may be similarly energized in a cascade of contacts and circuits such as at armature 341 and its front contact.

The relay 323 is one of a possible group of ten such relays which may be energized to connect the 100 bank contacts associated with the wiper 322 to the operating magnet of one hundred notching relays such as 475 to 479, inclusive.

It is true that the number of group relays such as 323 and 324 may be increased as required to care for the additions and changes in a given station, such as 01.

In analyzing the operation of the selecting devices thus far, it will be seen that as a result of the operation of the switch S1 in the manner described, a relay, such as 209, is energized to complete one point in the energizing circuit of the group relays, such as 323, which may be associated with the contacts of relays such as 209.

In practicing the invention, however, the station selecting relay, such as 209, is equipped with only sufficient contacts to provide a means of selecting the required number of group relays, such as 323 and 324. Likewise, the group relays such as 323 and 324 are equipped with only sufficient contacts to provide a means of selecting the required number of notching relays associated with each group.

The conductors 351 to 354, inclusive, which are connected to certain contacts on the group relay 323, may be considered cross-connecting wires, since one end of the circuit is terminated on the terminal strip illustrated in Fig. 4. In this way it is possible to connect the contacts on the group relays to any desired notching relay magnets.

As a further result of the deenergization of the relay 304, in the manner previously described, one point in the energizing circuit of the stepping magnet 476 of the selected notching relay associated with the switch B020, is completed at armature 318 and its back contact.

In case the dispatcher wishes to check the accuracy of his selecting devices means are provided to rapidly energize and deenergize the operating magnet of the notching relay to rotate its associated cam mechanism and complete circuits to the lamp signals associated with the switch symbol which has been selected.

In order to perform this operation the dispatcher will actuate the key K2 in such manner that the spring 105 engages its contact 107. As a result a circuit is completed from positive battery interrupted by the commutator 108, spring 105 and its contact 107, conductor 138, armature 318 and its contact, wiper 322 and its associated bank contact 20, armature 331 and its contact, conductor 351, and the winding of the operating magnet 476 to negative battery. The energizing circuit of the magnet 476 is intermittently opened and closed over the path just traced. This operation of the stepping magnet 476 of the notching relay associated with the symbol B920 in station 91 causes the operation of the lamp signals on the oil switch indication B920, in the following manner.

The notching relay mechanism is conventionally shown in Fig. 4. This device comprises a toothed wheel 435 which is rotated one step on each forward movement of the armature 432, to which is attached the pawl 433. Each time the stepping magnet 431 is deenergized the armature 432 is returned to normal position by the spring 434. In this manner the ratchet 433 is positioned to cause the next step of the toothed wheel 435 upon the energization of the magnet 431.

The cams 436 to 438, inclusive, are attached to the common shaft 459 which is driven by the toothed wheel 435.

Each cam has two pins which are located exactly opposite each other on the circumference of the cams. The toothed wheel 435 has eight teeth, and this wheel may therefore be rotated to cause the cams 436 to 438, inclusive, to take eight different positions.

The pins or projections on the circumference of the cams 436 to 438, inclusive, are so positioned on their respective cams with reference to each other cam as to cause the actuation of the spring contacts associated with each cam upon each fourth step in the step-by-step operation of the cam.

The projections 444 located on the cam 436 first actuates the armature 439 to cause it to close its contacts. The next step in the rotation of the cam causes the projection 444 on the cam 436 to be moved out of engagement with the spring 439, and the projection 447 on the cam 437 to be moved into engagement with the spring 440, in such manner that the spring 440 closes its contacts. The next operation of the cam causes the pin or projection 447 to disengage itself from spring 440 and the projection 448 on cam 438 to be moved into engagement with the spring 442, in such manner that the spring 443 makes contact with its associated spring. The fourth movement of the cam brings the rotation of the projection 448 out of engagement with the spring 443 and causes the cam springs to assume the position shown in Fig. 4A.

As a result of the operation of the notching relay device in the manner just described, the oil switch symbol B920 of station 91 displays "hold", "closed" and "tripped" indications in the order named when the key K2 is actuated to complete the circuit for rapidly energizing and deenergizing the circuit of the stepping magnet 476. When the spring 405 closes its contact, a circuit is completed from negative battery at the slow speed interrupter 499, spring 405 and its contact, filament of the lamp signal 424 to positive battery. The lamp signal 424 is intermittently energized over the path just traced.

It will be noted that the lamp signals 423 and 424 were energized in series prior to the operation just described, however, the resistances of the lamp filaments are such that both lamps burn very dim.

When the cams associated with the notching relay are moved into the second or sixth position, the springs 406 and 407 are operated to close their contacts. As a result, there is a circuit completed from positive battery, contact and spring 406, and filament of the lamp signal 423, to negative battery. The red lamp 423 is energized over this path to illuminate the symbol B920 a steady red.

When the notching relay cams are in positions three or seven, the spring 408 is actuated to complete a circuit from negative battery at the contact and spring 408, and filament of the lamp signal 424 to positive battery. The green lamp 424 is energized over this path to illuminate the oil switch symbol B920 with a steady green signal.

The circuits for energizing the lamps associated with the symbol B920 are completed rapidly as the stepping magnet 476 is energized and deenergized in the manner previously described. This means is used to enable the dispatcher to readily identify the selected switch symbol.

It will be noted that by operating the notching relay in the manner described the switch symbol B920 is illuminated with signals indicative of the "hold", "close", and "trip", positions of the oil switch B920. At spring 407 and its contact certain circuits are opened and closed in turn, due to the operation just described which will result in the automatic operation of the various tell-tale signal indications, which are controlled by the circuits shown in Figs. 6, 7, and 8. As a result the dispatcher can quickly check not only the accuracy of the operation of his selecting mechanism, but can also determine whether a switching operation will result in a loss of energy or effect continuity of service on any part of the system, as indicated symbolically by the one-line diagram.

Having checked the operation of the signalling devices and determined that it is satisfactory to operate the oil switch represented by the symbol B920, the dispatcher may now operate the notching relay to set up any desired signal indication on the switch symbol B920, in the following manner.

The dispatcher may operate the stepping magnet 476 under control of the key K2 by actuating the key lever to the opposite position to close the connection between spring 104 and its contact spring 106. Each time the key K2 is operated in this manner there is a circuit completed from positive battery at spring 101 of the key K1 and its contact spring 103, spring 104 and its spring 106, conductor 139, and over the previously described circuit to the winding of stepping magnet 476 and negative battery. The stepping magnet 476 may be energized and deenergized by the operation of the key K2 in the manner just described to cause the rotation of the cams and the operation of the springs associated with said cams to set up the desired signal indication on the switch symbol B920. In this instance the dispatcher desires to indicate that the B920 switch is in the closed position.

He, therefore, sends the impulses required to actuate the cam springs 406 and 407.

As a result there is a circuit completed from positive battery on working contact and spring 406, and filament of the lamp signal 423 to negative battery. The lamp 423 is energized over this path to display an indication that the oil switch B020 is in the "closed" position.

It will be noted that when the notching relay is in a position to indicate the "closed" position of the symbol representing the oil switch B020, that the circuits between terminals B and R on the terminal block are closed at spring 407 and its contact.

In a manner similar to that described in connection with the operation of the stepping magnet 476, the stepping magnets 475, 477, and 478 may be selected and operated to set up lamp signal indications on the switch symbols B021, B022, and B027, respectively.

When the symbols B021, B020, B022, and B027, are illuminated by steady red lamp signals they indicate that the line disconnect B021, the oil switch B020, bus disconnect B022, and the by-pass of the oil switch B027, are closed, the auxiliary contacts, such as 407 and its upper contact, associated with the notching relays are closed to complete circuits to cause the operation of the signalling circuit and to provide for tell-tale indications in a manner which will be hereinafter described.

Having indicated on the symbol representing the oil switch B020 that the switch is in the "closed" position in the manner described, the dispatcher will now release the selecting devices to their normal position.

To release the selector S2 and the selector S3 the dispatcher returns the key K1 to its normal position. As a result the energizing circuit of the relay 301 is opened at spring 100.

Upon the deenergization of the relay 301, the energizing circuit of the relay 302 is opened at armature 313 and its front contact, while at armature 313 and its back contact one point in the energizing circuit of the release magnet 307 is closed.

Upon the deenergization of relay 302 a circuit is completed from positive battery at armature 313 and its back contact, armature 315 and its back contact, off-normal springs 308 and 309, and winding of the release magnet 307 to negative battery. As a result of the energization of the release magnet, the wiper shaft and associated wipers of the switch S3 are returned to their normal position. When the wiper shaft is in its normal position the off-normal contacts are also restored to their normal positions and the circuit of the release magnet 307 is opened at contacts 308 and 309.

As a further result of the deenergization of the relay 302, the energizing circuit of the relay 200 is opened at armature 316.

As a result of the deenergization of the relay 200, the energizing circuit of the relay 202 is opened at armature 212 and its front contact, while at the back contact of armature 212, one point in the energizing circuit of the release magnet 207 is completed.

Upon the deenergization of relay 202 the release magnet 207 is now energized over a path which extends from positive battery at armature 212 and its back contact, armature 213 and its back contact, armature 214 and its back contact, off-normal spring 254 and its working contact 210, and the winding of the release magnet 207 to negative battery. The energization of the release magnet over the circuit just described causes the return of the wiper shaft and the associated wipers of switch S2 to restore to their normal position in the same manner as that described in connection with the release of the switch S3.

With the wiper shaft in the normal position the off-normal contacts of switch S2 are again restored with the result that the circuit of the release magnet 207 is opened at springs 254 and 210, while the contact between spring 252 and 253 is broken and spring 252 is again connected to the contact of lever spring 251.

As a still further result of the deenergization of the relay 202 another point in the energizing circuit of the relay 205 is opened at armature 215 and its contact. The relay 205 was momentarily energized due to the operation of the relay 200, but since the energizing circuit is now open at armature 215 and its contact, the relay 205 will again retract its armatures 216 to 218, inclusive, and thus return the relay to its normal deenergized condition.

As a still further result of the deenergization of the relay 202, one point in the energizing circuit of the relay 110 is opened at armature 216 and its contacts. However, the relay 110 is maintained energized under control of the key K3 over the circuit previously described.

From the description given of the operation of the selecting equipment comprising the selectors S1, S2, S3, and their associated relay circuits, it will be obvious that the dispatcher may operate the selecting devices S2 and S3 and their associated relay circuits from this point to bring about the selection of a second notching relay and its associated circuit by dialling the four digits comprising the switch number. The selectors S2 and S3 are now in their normal positions, while the selector switch S1 is in its operated position and maintained so under control of the key K3. The relay 209 is still energized as a result of the circuit which extends from positive battery at spring 109 and its contact, armature 124 and its contact, armature 125 and its contact, wiper 133 and its associated bank contacts, conductor 138, and the winding of relay 209 to negative battery.

As a result of the deenergization of the relay 202, and the deenergization of the relay 204 the energizing circuit of the relay 323 has been opened.

The group selecting relay 323 and its associated multi-contact relays are, therefore, deenergized.

Should the dispatcher now operate the calling device CD in such manner as to transmit impulses for the selection of the notching relay associated with the switch symbol B021 of station 01, the selector switches S2 and S3, would be operated in the same manner as previously described with the result that the wipers associated with the switch banks on switch mechanism S2 and S3 will be brought to rest on different bank contacts to result in the connection with the energizing circuit of the stepping magnet 475, which is associated with the signals of the switch symbol B021.

Assuming, however, that the dispatcher desires to restore the selector S1 to normal position. He may do so by a momentary operation of the key K3 which opens the holding circuit of relay 110 and also the circuit of relay 209. As a result, these relays deenergize. The relay 209 is, however, immediately reenergized upon closure of contacts 209.

As a result of the deenergization of the relay 110, the energizing circuit of the relay 112 is opened at armature 117 and its front contact, while at the back contact of this armature, one point in the energizing circuit for the release magnet 116 is closed.

The slow-to-release type relay 112 retracts its armatures after a slight interval of time to complete the energizing circuit of the release magnet 116. The energizing circuit of the release magnet 116 may be traced from positive battery at armature 117 and its back contact, armature 120 and its back contact, armature 122 and its back contact, off-normal springs 129 and 128, and the winding of the release magnet 116 to negative battery. The release magnet is energized to restore the wiper shaft and the switch mechanism to its normal position in the same manner as described in connection with the release of the selectors S2 and S3.

When the switch mechanism is in the normal position its off-normal springs are also again moved to their normal position. In this manner the circuit of the release magnet 116 is opened at springs 128 and 129.

As a further result of the deenergization of the relay 112, the energizing circuit of the relay 209 and lamp 429 is opened at armature 124, accordingly the relay 209 is deenergized, and the lamp extinguished.

When the pilot signal 01 on the one-line diagram, Fig. 5, is darkened by the deenergization of the pilot lamp 429 as just described, the dispatcher is informed that the selector switch S1 has been returned to its normal position, and that all apparatus and circuits are now in a position to permit a selection of another station and another switch symbol as may be desired.

Referring now more particularly to the circuits and apparatus conventionally shown in Fig. 4, by means of which the dispatcher may set up the desired indications on the switch symbols B020, B021, B022, and B027, attention is called to the circuits completed by the springs 403, 407, 411, and 415, and their respective spring contacts. It will be seen that in any case when a notching relay is in the position to close the circuit for energizing its red lamp signal that the auxiliary contacts associated with the notching relay are also closed. That is, when the red lamp 421, for example, is energized, spring 403 is making contact with its spring. Likewise, when lamp 423 is energized the lever spring 407 is completing a circuit through its contact.

Attention is called to these auxiliary contacts associated with the notching relay which are always closed when an indication is displayed on the symbol to indicate the "closed" condition of a switch, and are always opened when any other signal indication is displayed.

In the foregoing description the method of selecting the auxiliary apparatus used in setting up the various indications on the dispatcher's control board, has been described. The methods and circuits used in setting up the various signal indications through the medium of the auxiliary apparatus, such as notching relays, has also been described.

Referring now more particularly to Figs. 5 to 8, inclusive, the circuits which may be automatically operated as a result of the operation of devices so far described will be analyzed.

It is to be understood that only the lamp signal indications associated with the oil switch symbol, the air brake switch symbol, and the disconnect switch symbols are directly controlled by the circuits of the notching relay devices in the manner described in connection with the drawings in Fig. 4. Figs. 6, 7, and 8 illustrate the circuits and apparatus which are automatically operated through auxiliary circuits associated with the notching relay devices. The auxiliary contacts used in connection with the circuits shown in Figs. 6, 7, and 8 are associated with the cam on the notching relay which controls the energization of the red lamp signal to set up an indication of a closed position on the switch symbol indicating the oil switch, air brake switch, or the disconnect switch.

By reference to the drawings, Fig. 4, it will be seen that any desired combination of spring contacts may be controlled by the operation of the cams on the notching relays.

In tracing the operation of the "tell-tale" indications in connection with the one-line diagram illustrated in Fig. 5, it will be necessary to keep in mind the one-line diagram in Fig. 5, as well as the circuits shown in Figs. 6 to 8, inclusive.

In Figs. 6, 7, and 8 the auxiliary contacts on the notching relays which control the tell-tale indications have been conventionally shown by means of open and closed contacts, numbered to agree with corresponding switch symbols shown in Fig. 5.

Fig. 8 shows the notching relay auxiliary contacts for the circuits and apparatus used to provide tell-tale signals on that portion of the one-line diagram which is associated with station 17 as shown in Fig. 5. Figs. 6 and 7 illustrate in a similar manner the circuits and apparatus used in electrifying the one-line diagram that is associated with station 01 as shown in Fig. 5.

The one-line diagram as shown in Fig. 5 represents a system of power transmission and distribution which includes two generators which are illustrated by the switch symbols G1 and G2, respectively, and are controlled by devices (not shown) for supplying energy to the system represented. The connection of energy from these generators to the system is controlled by the oil switches 2310 and 2320. These generators deliver energy at 2300 volts to transformer banks designated bank 3 and bank 4, where the energy is transformed to a potential of 13.2 k. v.

In addition to this source of energy supply, there is another source which is represented by the inter-connection designated in station 01. This source of energy supply delivers 60 cycle energy at 66 k. v. controlled by the oil switches B010 and B020 through transformer banks in station 01, designated bank 1 and bank 2, respectively, where the energy is stepped down to 33 k. v. for transmission over the system represented.

A rotary converter 526 at Virden is shown connected to the transmission system at transformer bank designated as bank 516. This rotary converter may be of the type which is used in the operation of electric railway systems.

Sufficient tell-tale indications are provided to illustrate the manner in which the system dispatcher is guided by the operation of such signals and the extent to which he may use the system dispatcher's control board as a sole guide to the operation of the power system. At 521, 522, 507, 508, 505, and 506, the tell-tale indications used to indicate a live or dead bus are conventionally shown. At 513, 514, 518, 519, the tell-tale signals used to indicate the live or dead condition of lines or circuits are conventionally shown. The telltales 524 and 525 are associated with two-line or feeder circuits from station 17 to illustrate the manner in which live or dead feeder circuits may be indicated. Lamp signal indications on all transformer banks shown on the one-line diagram and similar indications on the generators and the rotary symbols comprise the remaining tell-tales illustrated, in a conventional manner, on the one-line diagram.

From the description which follows it will be seen that all of the tell-tale signal indications are automatically operative when certain indications of the positions of the various switches represented on the one-line diagram are set up by the dispatcher.

The contacts which control the relay and lamp signal circuits as shown in Figs. 6 to 8, inclusive, are designated in a manner to indicate the signals on the one-line diagram as shown in Fig. 5 with which they are associated.

For instance, the contacts on the notching relays which are associated with the switch symbol B021, B020, and B022, are designated B021′, B020′, and B022′, respectively, on Fig. 6. The same holds true of the designations of all contacts shown on the circuits in Figs. 6 to 8, inclusive.

Referring now to Fig. 6 the oil switch B010 and the by-pass switch B017 are open as represented by open contacts B010′ and B017′ and the transformer bank designated bank 1 in station 01 is dead. It will be seen that the circuit of the lamp signal 631 is open at the contacts of armatures 617, 619, and 621 on relays 601, 603, and 604, respectively.

The oil switch B020 and the by-pass switch B027 are open and no energy from the interconnection is connected to the transformer bank designated bank 2. It will be seen that the energizing circuit of the lamp signal 641 is open at armature 615 on relay 605, armature 612 on relay 607, and the armature 610 on relay 608. The oil switches B110 and B120, and the by-pass switches B114 and B124, are also represented as open in Fig. 6. In Fig. 8 the oil switches 2310 and 2320 are open as represented by the contacts shown.

It will be assumed that the energy from the interconnection is disconnected from the transmission system at the oil switches B010 and B020, and that the energy from the generators G1 and G2 is disconnected from the system at oil switches 2310 and 2320. Figs. 6 to 8, inclusive, show this condition and also illustrate that certain other switches are open as indicated by the separated contacts opposite the symbol designations on these drawings.

Wherever the contacts are shown open, in Figs. 6 to 8, inclusive, it is to be assumed that a green lamp signal is burning on the switch symbol. When the numbered contacts are shown as closed, it is to be assumed that the red lamp is burning on the associated switch symbol of the one-line diagram, Fig. 5.

The interrupter 700 shown in Fig. 7 is constantly operating to supply one side of an interrupting circuit over conductor 2. This interrupter 700 opens and closes the connections between the brush connected to conductor 2 and the positive side of the battery at a speed of approximately 120 impulses per minute.

The tell-tale indications, such as 513 and 514, associated with the line circuits are displaying flashing red signals to indicate that the line conductors are dead. It will be seen that the lamp signal 710 is connected to the interrupted positive battery at armature 715 and its back contact. It will also be seen that the lamp signal 711 is connected to the interrupter on conductor 2 by way of armature 714 and its back contact.

In a similar manner the other line tell-tale indications are caused to display flashing red signal indications by reason of the circuits shown in Figs. 6 to 8, inclusive, to indicate that the lines are dead.

The bus tell-tales such as 756 and 757 display flashing red signals to indicate that these busses are dead. This is due to the connection of lamp signals 755 and 758 to the interrupted positive battery by way of armatures 754 and 759, respectively. In a similar manner by the circuits shown in Figs. 6 to 8, main bus 3, transfer bus 4, and busses 3 and 4 are indicated as being dead.

Since there is no energy connected to any part of the system as shown in the one-line diagram, Fig. 5, the transformer banks which are out of service will show dark symbols while those that are supplying energy, such as 515 at Virden, 517 at Nela, and 523 at Laclede, will show flashing red signals to indicate that these transformer banks are not getting energy and therefore the communities represented are without electrical power or light service.

The rotary 526 is shown disconnected from the transmission system as the oil switch 0110 is represented in Fig. 7 as being in its open position, and the rotary transformer bank 516 which supplies the rotary with energy will indicate an out-of-service condition. The energizing circuits of the lamps 719 and 720 being open at contacts 0110′.

The motor operated disconnects 1723, B313, B413, B113, and B123, in station 17 are normally open as the transfer bus 4 is normally dead or energized through the bus tie oil switch T010.

Let us assume that the dispatcher desires to energize the power system by connecting the energy from the generator G1 to the system, and to pick up the load by means of energy supplied by this generator. The generator symbol G1 is illuminated by the clear lamp signal 802 which is energized over the path which includes contacts 2312C and armature 804 and its back contact. This indicates to the dispatcher that there is energy available from the generator G1.

To pick up the load in the aforesaid manner, the dispatcher will communicate with the attendant at Venice, station 17, and issue an order to close the oil switch 2310 and the oil switch B310. When the operator advises the dispatcher that his orders have been carried out, the dispatcher will select the proper symbol control circuit by dialling the station 17 and then the switch numbers 2310 and B310 in turn. He will then operate the keys on his control desk to set up indications on the switch symbols 2310 and B310 to indicate that these switches are in their closed position. As a result, contacts 2310—A, 2310—B, and 2310—C associated with the circuits which control the switch symbol 2310 will be closed. Likewise the contacts B310′ which are associated with the notching relay device controlling the signals on symbol B310 will be closed.

There is now a circuit completed for energizing the relay 809 over a path which includes contacts 2312—A, 2310—A, and 2310—B, and as a result the energizing circuit for the lamp signal 802 is opened at the back contact of armature 804, while at the front contact of this armature a circuit is completed to cause the energization of the lamp 801 over the path which includes contacts 2312—C and 2310—C. In this manner the generator symbol G1 is illuminated by the red lamp 801 to indicate that the energy from the generator is connected to the transformer bank designated bank 1 in station 17.

Prior to the closing of the oil switch 2310, which resulted in the closing of the contacts 2310—A, 2310—B, and 2310—C, the relay 808 was deenergized and the red lamp 810 was intermittently energized from the interrupter over conductor 2 to provide a flashing red signal on the transformer symbol designated bank 1 to indicate that this transformer bank was dead. As a result of the operation described, however, relay 808 is energized over a path which includes contacts 2312—B and 2310—B. As a result, the lamp 810 is now energized by the connection to positive battery by way of armature 809 and its front contact. The symbol designated bank 1 is now illuminated a steady red to indicate that the transformer bank is energized.

As a result of the operation of the notching relay to cause the display of the closed indication on the switch symbol B310, the contacts B310' are closed. The relay 805 is now energized over a path which includes contacts B312', B310', B311', conductor 899, contacts 2312—B, and 2310—B, to transfer the energizing circuit of the lamp 807 from the interrupter circuit on conductor 2 to positive battery at the front contact of armature 806. As a result the bus tell-tale symbol 505 is illuminated a steady red to indicate to the dispatcher that the main bus is energized.

When the main bus is energized in the aforesaid manner, a circuit is completed which includes contacts B412', B410', B411', and conductor 898 to cause the energization of the relay 851. As a result, the energizing circuit of the lamp 867 is transferred from the interrupted positive battery on conductor 2 to positive battery at front contact of armature 852. The resultant steady red illumination of the symbol designated bank 2, in station 17, indicates to the dispatcher that the associated transformer bank has been energized. It will be noted that the transformer bank represented by symbol bank 2 is still disconnected from the circuits of generator G2 by the oil switch 2320. However, the transformer bank is energized by the back feed from the main bus 3, and this completes the indication to the dispatcher that he will be required to synchronize before connecting the energy from generator 2 to the power system, since it is already live as indicated at transformer bank 2. If the transformer symbol bank 2 were energized by a flashing red signal, the dispatcher could close the oil switch 2320 and connect the energy from generator G2 to the power system disregarding the alarm signal displayed by the synchronizing lamp signal 866 which is associated with the oil switch 2320.

The synchronizing lamp 866 is energized to display a steady indication on the symbol associated with the oil switch symbol 2320, over a path which includes the back contact of armature 854. Thus at this time the dispatcher receives a warning indication by means of the steady red signal on the transformer symbol designated bank 1 and the synchronizing lamp symbol 866, which should keep him from making the mistake of ordering the oil switch 2320 closed without a synchronizing operation.

As a further result of the energization of the main bus over circuits previously traced, a circuit is completed to cause the energization of the relay 811. This circuit includes contacts 1712', 1711', 1721', 1720', 1712', and the circuits previously traced for energizing the main bus. Relay 811 when energized transfers the energizing circuit of the lamp 813 from the interrupted positive battery on conductor 2 to positive battery at the front contact on armature 812. A steady red signal on the transformer symbol 523 now indicates that this transformer is energized to supply energy to Laclede.

As a still further result of the energization of the main bus 3 in the aforesaid manner, the relay 813 is energized over a path which includes contacts 1713', contacts B312', B310', B311', conductor 898, contacts 2312—B, and 2310—B. When relay 813 is thus energized, the energizing circuit of the lamp 855 associated with the feeder tell-tale symbol 524 is transferred from the interrupted positive battery on conductor 2 to positive battery at the front contact of armature 814. The steady red signal on the tell-tale symbol 524 indicates to the dispatcher that this feeder is live and supplying energy to the customers which may be connected to its circuit.

Since the operation of every switch is promptly reported to the dispatcher from the field, since the dispatcher's control board sets up indications which are representative of the true condition and position of the various switching elements, and since the dispatcher has indications automatically displayed on the control board which indicate that the 60 cycle generator represented by symbol G1 is delivering energy at 2300 volts, has been connected to the transformer bank designated bank 1, where the power has been transformed to 13,200 volts, and that as a result of the switching operations performed in accordance with his instructions, the main bus 3 which carries 13,200 volts has been energized to pick up the power load on feeder 10 and transformer bank 523 at Laclede.

In order to energize the 33 k. v. bus in station 17 and in this manner pick up additional load over sections B of lines 1 and 2, the dispatcher will now issue an order to the station attendant to close the oil switch B110, and the oil switch B910, asking the attendant to report back to him after closing the oil switch B110 and before he picks up the load by means of the oil switch B910.

The transformer bank is dead as indicated by the dark symbol designated bank 3, prior to the closing of the oil switch B110.

When the station attendant reports to the dispatcher that he has closed the oil switch B110, the dispatcher in turn selects the symbol B110 to give him connection with the circuits which control this symbol on the dispatch board. He then operates the necessary key to complete the circuit in a manner to display a steady red indication on the symbol B110 on the dispatcher's control board to indicate that this switch is in closed position. As a result, a circuit is completed to cause the energization of the relay 820. This circuit includes contacts B110', B111', and B112'.

As the result of the energization of relay 820, a circuit is completed to cause the energization of the relay 821 over the path which includes armature 826 and its contact, main bus 3, and contacts B310', B312', B311', 2312—B, and 2310—B. As a result, the lamp 859 in station 17 associated with the transformer symbol designated bank 3, is energized over a path which includes front contact at armature 827, and armature 828 and its front contact. The transformer symbol designated bank 3 is, therefore, illuminated a steady red to indicate to the dispatcher that the transformer bank has been energized by reason of the circuit just closed.

The dispatcher now instructs the station attendant to proceed to complete his order by closing the oil switch B010. When the station operator reports back to the dispatcher, the switch symbol B010 is selected and circuits completed to indicate the closed position of this switch.

As a result of this operation, contacts B010' are closed to complete the energizing circuit of the relay 822 over a path which includes contacts B011', B010', and B012'.

A circuit is now completed to cause the energization of the relay 833 over the path which extends from positive battery at contacts 2310—B, and the series circuit through the contacts 2312—B, B311', B310', and B312', front contact and armature 826, armature 830 and its front contact, bus 3, and the winding of relay 833 to negative battery. When relay 833 is energized in this manner the energizing circuit of the lamp signal 862 associated with the bus tell-tale symbol 507 is transferred from the interrupted positive to steady positive battery at armature 834 and its front contact. The steady red signal now displayed on the bus tell-tale symbol 507 indicates to the dispatcher that the 33 k. v. bus 3 has been energized.

Due to the operation so far described, it is apparent that the positive side of the battery supplying energy to the circuits shown in Figs. 6 to 8, inclusive, has now been extended through contacts in series and circuits traced thus far to bus 3. Since the oil switch 0380 and its associated disconnects 0381 and 0383 are closed, a circuit is now completed which extends from positive battery on bus 3 and through the circuits controlled by contacts 0383', 0380' and 0381', over line 1, thence over the circuit which includes the back contact and armature 706 and the winding of relay 705 to negative battery.

Upon the energization of relay 705 a circuit is completed at armature 707 and its front contact to cause the energization of relay 712. When relay 712 is energized, the energizing circuit of the lamp 711 associated with the line tell-tale symbol 514, is transferred from the interrupted positive to steady positive battery at armature 714. A steady lamp signal now illuminates the line symbol 514 to indicate to the dispatcher section A of line 1 is energized.

As a further result of the energization of the relay 705, positive battery at the front contact and armature 707 is extended over circuits controlled by contacts 0104', 0106', and 0120' for energizing the relay 716. When relay 716 is energized, the transformer symbol 515 displays a steady red signal to indicate that the transformer is live and that the load consisting of the street lights at Virden has been connected to the system.

A still further result of the energization of relay 705 in the aforesaid manner is that a circuit is completed to cause the energization of the relay 741, which may be traced over the path which includes contacts 0102', 0104', and armature 707 and its front contact. As a result of the energization of relay 741 the lamp signal 740 associated with the line tell-tale symbol 519, is energized by positive battery at front contact and armature 742. The line symbol 519 now displays a steady red signal to indicate to the dispatcher that the section A of line 1 is live at the location of the symbol 519.

The relay 753 is also energized over a path which includes circuits previously traced and the contacts 0383', 0380', and 0381'. As a result, the bus tell-tale symbol 756 is illuminated by a steady red lamp energized to apprise the dispatcher that bus 3 in station 01 has been energized.

Assume now that the dispatcher desires to pick up the load on the transformer 516 and the rotary 526. He will issue an order to the attendant at Collinsville station 01 to first close the disconnect 0107 and then close the oil switch 0110. The attendant at Collinsville may have to relay this instruction to the substation located at Virden or the dispatcher may be able to issue the order direct, as the switches named are controlled from station 01. When the dispatcher has been apprised that his instructions have been carried out, he will set up signals on the control board to indicate that the disconnect 0107 and the oil switch 0110 are closed.

As a result of the operation of the signalling devices on the control board in the same manner as heretofore described, the contacts 0117' are closed. A circuit is then completed to cause the energization of relay 721 over a path which includes contacts 0107', 0106', 0104', and front contact and armature 707.

Also, as a result of the operation of the control board in setting up the closed indication on the switch symbol 0110, the contacts 0110' are closed to complete a tell-tale circuit which indicates to the dispatcher that the transformer 516 has been conneced to the transmission system and is supplying the rotary 526 with energy. This tell-tale indication is produced by means of the energization of the lamps 719 and 720 associated with the rotary symbol 526 and the transformer symbol 516, respectively, over a path which includes contacts 0110' and positive battery at front contact and armature 722.

Assuming now that it is necessary to pick up additional capacity to carry the load of the system, and that the dispatcher decides to obtain the necessary capacity by taking advantage of the interconnection with the other system as designated on the one-line diagram Fig. 5. He will first issue an order to the attendant at station 01 to close the oil switch B010. He will then issue a separate order to synchronize and close in the oil switch B110.

Having been apprised that his instructions have been carried out, the dispatcher will perform the proper functions to register on the control board an indication that the oil switch B010 and the oil switch B110 are in their closed positions.

As a result of the operation of the dispatcher's control board in setting up these indications, the contacts B010' and B110' are closed. The relay 601 is then energized over a path which includes contacts B012', B010', and B111'. The relay 603 is likewise energized over the path which includes contacts B113', B110', and B111'.

An additional energy supply is now connected to the system by way of bus 3, contact and armature 620, and armature 616 and its contact.

The relay 602 is now energized over the path which extends from positive battery at the contact and armature 616, and the winding of relay 602 to negative battery.

The transformer symbol designated bank 1 in station 01 is illuminated a steady red due to the energization of the lamp signal 631 over the path which extends from positive battery at the front contact and armature 618, armature 617 and its contact and the filament of lamp signal 631 to negative battery.

The entire transmission system as shown in the one-line diagram, Fig. 5, is now supplied with energy over the interconnection in station 91, and from the generator G1 located in station 17.

It will be apparent from the description which has been given thus far that a dispatcher may now open the oil switch 2310, thus taking the energy from generator G1 in station 17 or from the system, without losing the entire load which will now be carried from the interconnection with another company. The dispatcher's control board will properly register information to this effect when the signalling devices are operated in the manner described.

It will be assumed, however, that the dispatcher has opened the oil switch 2310, and that he is carrying his entire load from the interconnection controlled by the oil switch B010 at station 01 and that due to some overload condition the oil switch B010 trips, and the dispatcher gets the report and sets up the indication on his control board.

The relay 601 is deenergized as a result of the opening of its energizing circuit at contacts B010', which occurs when the change is made on the control board. The energizing circuit of relay 602 is opened at armature 616, with the result that a circuit is now completed which extends from positive battery over the interrupted conductor 2, back contact and armature 618, armature 619 and its front contact, and the filament of the lamp 631 to negative battery. The transfer of the energizing circuit of the lamp 631 from positive battery to the interrupted positive battery by reason of the circuit just traced, causes the symbol designated bank 1, in station 01, to flash a red indication to signal the dispatcher that this transformer bank has lost energy.

As a further result of the deenergization of the relay 601, positive battery is removed from the energizing circuits of the relays 704, 753, 741, 744, 736, 721, 716, and 712, at armature 616 and these relays are accordingly deenergized to set up flashing red indications on the tell-tale symbols which are controlled by their circuits.

When the oil switch 2310 was opened, the relay 705 was deenergized due to the opening of its energizing circuit at contacts 2310—B. However, since the section A of line 1 was still energized prior to the opening of the oil switch B010, and the relay 704 is energized over a circuit which includes the back contact and armature 707, and the circuits controlled by contacts 0104', 0102', 0381', 0380', 0383', bus 3, contact and armature 620, and armature 616 and its contact.

When the relay 704 was energized in this manner, positive battery was connected to section B of line 1 at front contact and armature 706, and since this line extended continuously to the 33 k. v. bus 3 in Venice station 17, the circuits and customers supplied from Venice station 17 were still supplied with energy.

However, due to the deenergization of relay 601 the relays 821, 833, 813, 805, 811, 808, and 851, are now deenergized to cause the display of flashing red signal indications on the symbols controlled by the circuits of these relays.

The transformer bank of station 17, is represented by the transformer tell-tale designated bank 3. A circuit is completed which extends from interrupted positive battery on conductor 2, back contact and armature 828, armature 829 and its front contact, and lamp 859 to indicate to a dispatcher that transformer bank 3 has lost energy.

It will be seen that the dispatcher has obtained in this manner an indication that the entire system, as represented by the one-line diagram in Fig. 5, has lost energy as a result of the operation of the control board to set up an indication of the opening of the oil switch B010.

Having described in general the operation of the tell-tale circuits to indicate the condition of the power system as the result of switching operations performed in the field and recorded on the dispatcher's control board by means of the signalling devices provided, attention is now called to the arrangement of relays and circuits by means of which additional and important signalling indications are obtained for the guidance of the system dispatcher and which are automatically operative as a result of the recording of the various switch operations on the control board.

Either one or the other or both transformer banks 1 and 2 in station 01 may be used in supplying energy to the power system. It is desirable to know when either one of these banks is disconnected from the system. This is indicated by a dark transformer symbol on the one-line diagram.

When indications of apparatus representing station 01 are displayed on the dispatcher's control board that the oil switch B020 and its associated by-pass switch B027 is open and the oil switch B120 and its associated by-pass switch B124 are open, the relays 605, 607, and 608 are deenergized as it will be seen that the energizing circuit of the relay 605 is open at contacts B020' and B027', while the energizing circuit of the relay 607 is open at contact B120, while the energizing circuit of the relay 608 is opened at contact B124. The result is that the lamp 641 is disconnected from the circuits of the relay 606 at armature 615 on relay 605, armature 612 on relay 607, and at armature 610 on relay 608. The transformer symbol representing bank 2 of station 01 is therefore dark to indicate to the dispatcher that the transformer bank is disconnected from the system.

For the purpose of illustrating the operation of the relays 605 to 608, inclusive, in the various circuit combinations, it will be assumed that the dispatcher has recorded indications on the control board to designate that the oil switch B120 is open and that the by-pass switch B124 is closed. It will also be assumed that the oil switch B020 is closed and that the system is connected to a source of energy through the oil switch circuit B020. The relay 608 is then energized over a path which includes contact B124'. The bus 4 is then energized over the path which includes the contact and armature 614, and armature 609 and its contact. The relay 760 which is tied to bus 4, will be energized over this path. As a result, the lamp signal 758 will be energized to display a steady red indication on the bus tell-tale symbol 757 to indicate to the dispatcher that bus 4 is energized.

The dispatcher may now have the attendant at station 01 to energize the system by closing a by-pass switch such as 0384. From the description of the operation thus far, it will be apparent that the relay circuits and their lamp signals will be operated to indicate that the system has been energized in this manner.

If the oil switch B020 is now indicated on the control board as being open, the relay 605 is again deenergized. The transformer bank symbol 2 is illuminated a flashing red due to the energization of the lamp signal 641 over the path which includes the contact and armature 610, and armature 613 and its back contact to the interrupted positive potential on conductor 2. This indicates to the dispatcher that the transformer bank 2 has lost energy due to the operation of the oil switch B020.

Attention is now called to the operation of the tell-tale circuits associated with the symbols which indicate the disconnects 0131 and 0132 at Nela. These disconnects are of the type known as single-pole double-throw, and their blades can be closed in one direction or the other, opened in one direction or the other or both directions at the same time, but they cannot be closed in both directions at the same time. The relays 723 and 729 are associated with the tell-tale circuits to indicate the positions assumed by the blades of a switch of this type often used in power switching circuits.

It will be assumed that the blade 0132 is closed with the result that the blade 0131 is open. The relay 723 is energized over the path which includes contact 0132'.

The energizing circuit of the relay 729 is opened at armature 725.

At armature 732 and its back contact a circuit is closed to energize the lamp signal 734 to illuminate the switch symbol 0131 green to indicate that this switch is in its open position. At armature 724 and its front contact a circuit is closed to energize the lamp 727 associated with the symbol 0132 and to illuminate the symbol with a steady red indication to apprise the dispatcher that the switch 0132 is in its closed position. Section A of the line conductor 2 is connected to the transformer bank 517 at armature 728 and its contact, while at armature 730 and its contact section A of the line conductor 1 is disconnected from the transformer bank 517.

When both of the switches 0132 and 0131 are in their open position, the double-throw single-blade switch is in its middle position. The contacts 0132' and 0131' are both open in this case, with the result that the relays 723 and 729 are deenergized. It will be plain that under this condition the symbols 0132 and 0131 will both be illuminated by a steady green lamp signal and that the section A of lines 1 and 2 will be disconnected from the transformer bank 517 at armatures 726 and 730. It will be apparent that it is not possible for the dispatcher to indicate closed conditions on symbols 0132 and 0131 at the same time, and that the circuits shown prevent energization of relays 723 and 729 at the same time.

The relay 721 controls the tell-tale indications on the transformer bank 516 and the rotary 526. If the oil switch 0110 is closed and the relay 721 is deenergized and a flashing red signal is displayed on the transformer bank symbol 516 and the rotary symbol 526 to indicate that these circuits have lost energy due to a switching operation which has resulted in the loss of energy to the system at a point on the line side of the oil switch 0110. If the relay 721 is energized and the oil switch 0110 is closed the transformer bank at the rotary symbol is illuminated a steady red to indicate that energy is being supplied to the bank and to the rotary from the power system. If, however, the oil switch 0110 is open, the symbols 516 and 526 are dark to indicate to the dispatcher that the rotary and the transformer bank have been disconnected. The circuits by which these indications are set up will be apparent from Fig. 7, and the description of operation previously given.

Three separate indications are required on each of the symbols used to designate generators, such as generator G1 in station 17. When the oil switch 2310 is open the generator symbol G1 is illuminated by the white or clear lamp 802 to indicate that energy is available on the generator, but is not in use or connected to the system. The circuit for energizing the lamp 802 may be traced from negative battery at back contact and armature 804, and includes contacts 2312—C.

When the oil switch 2310 is closed and the associated disconnect 2312 is also closed, the red lamp 801 is energized over a circuit including the contacts 2310—B and the armature 804 and its front contact, to illuminate the generator symbol G1 steady red to indicate that the generator is supplying energy to the system, the relay 800 being energized through the contacts 2312—B and 2310—B, respectively.

When the oil switch 2310 is open, and the associated disconnect 2312 is also open, the generator symbol G1 is dark to indicate to the dispatcher that the generator is shut down. From the drawing in Fig. 8, it will be seen that when contacts 2310—C and 2312—C are open the energizing circuit of the lamps 801 and 802 are open and the symbol G1 is therefore dark. The lamps 801 and 802 are of high resistance and not enough current flows through the two filaments in series to cause illumination under this condition.

When more than one transformer bank is used in supplying energy to a portion of the power system, three indications are required on the transformer bank symbols which are indicative of its condition. For instance when the oil switch B020 and the by-pass switch B027 in station 17 are open and the oil switch B120 and the motor operated disconnect B123 are also open, the transformer symbol represented as bank 4 is dark. By reference to the drawing of Fig. 8, it will be seen that when the contacts B020', B027', B120', and B123', are open that the relays 837 to 841, inclusive, are deenergized, and there is no circuit for energizing the lamp signal 858 associated with the bank 4 under this condition.

If the by-pass switch B027 in station 17 is closed, however, the contact B027' will be closed to cause the energization of the relay 837. As a result, one point in the energizing circuit of the relay 839 is completed at armature 850 and its contact, in such a manner that should the 33 k.v. bus 4 be connected to positive battery through any of the circuits of the tell-tale one-line diagram, the relay 839 will be energized. Relay 839 controls one point in the energizing circuit of the lamp 858, and in case the relay 839 is energized under this condition, there is a circuit completed to cause the energization of the lamp 858 over the path which includes contact and armature 849, and armature 846 and its front contact. If, however, the relay 839 is not energized when relay 837 is energized, there is a circuit completed which extends from the interrupted positive potential on conductor 2 at back contact and armature 846, armature 849 and its contact and the lamp 858 to negative battery. The signal 858 will therefore flash a red indication on the transformer symbol bank 4 when the relay 839 is deenergized and relay 837 is energized. This indicates to the dispatcher that with the transformer bank 4 connected to the bus 4 the transformer bank is dead because there is no energy on the bus 4. If the relay 839 is energized as before described, the dispatcher receives an indication by means of the steady red lamp signal on the symbol designated bank 4 to indicate that the transformer bank has been energized from bus 4.

When the by-pass switch B027 of station 17 is opened and the oil switch B029 is closed, the relay 839 will be energized through the contacts B021', B020', B022'. Under this condition the circuits of the relay 839 and the lamp signal 858 are connected to the circuits of the 33 k. v. bus 3 and the tell-tale operation will be the same as before described, that is, when relay 839 is energized the lamp signal 858 will be energized by its connection to positive battery. If, however, the relay 839 remains deenergized, the lamp signal 858 will be energized from the positive battery on the interrupter over conductor 2 with the result that the lamp signal 858 will flash a red indication on the transformer symbol bank 4 to indicate that the transformer is not getting energy from the bus 3.

When the motor operated disconnect B123 of station 17 is closed, the contacts B123' are closed to cause the energization of relay 841. At armature 843 and its contact, one point is completed to connect the energizing circuit of the relay 839 to the transfer bus 3. At armature 842 and its contact a circuit is completed to connect the lamp 858 to the circuit controlled by the armature 846 on relay 839 in such a manner that when the relay 839 is energized the lamp 858 will be energized by positive battery, while if the relay 839 is deenergized the lamp signal 858 will be energized by positive battery through the interrupter on conductor 2. From this explanation it will be apparent that if the transfer bus 4 is energized by positive battery, relay 839 will be energized to cause a steady red indication on the symbol representing bank 4 to indicate that the transformer is energized, whereas if the transfer bus is dead the relay 839 remains deenergized. In this case the lamp signal 858 will provide a flashing red indication on the symbol designated bank 4 to indicate that the transformer is connected to the transfer bus 4, but is not getting energy therefrom.

When the switch B123 of station 17 is open and the associated oil switch B120 is closed, the contacts B120' are closed to cause the energization of the relay 840. When relay 840 is energized, the lamp 858 is connected to the circuits of the armature 846, at contact and armature 844, and the energizing circuit of the relay 839 is connected to the main bus 3, at armature 845 and its contact. Therefore, if the main bus 3 is energized, relay 839 will deenergize to cause a steady red signal to be displayed on the symbol designated bank 4 to indicate a live transformer, whereas if the relay 839 remains deenergized due to the fact that the main bus is dead, the symbol will flash a red signal to indicate that the bank has been connected to the main bus 3, but is not being energized therefrom.

If the oil switch B120 and the motor operated disconnect B123 are both closed, it will be seen that the relays 840 and 841 will be energized. As a result, the main bus 3 will be connected to the transfer bus by a circuit completed at the contact and armature 845, and armature 843 and its contact. The relay 839 will likewise be connected to both busses, and the lamp 858 will be connected to the circuits of the armature 846, at the armature 844 and its contact and also at armature 842 and its contact. The result in this case is that if either bus is energized, the transformer bank will be energized and the symbol representing bank 4 will display the proper indication.

When the oil switch B020 in station 17 and the oil switch B120 are closed and the by-pass switch B027 and the transfer bus disconnect B123 are opened, the contacts B120' and B020' will be closed. In this case the relays 840 and 838 will be energized. The 33 k.v. bus 3 will be connected to the 13.2 k.v. main bus 3 under this condition as a result of circuits closed at the contact and armature 848 and at armature 845 and its contact. The lamp 858 is connected to the armature 846 at the contact and armature 847 and at the contact and armature 844. Under this condition, if the 13.2 k.v. main bus 3 is energized the 33 k.v. bus 3 will also be energized. As a further result the relay 839 will be energized and the lamp 858 will display a steady red indication on the transformer symbol designated bank 4 to indicate to the dispatcher that the transformer bank is energized. If, however, neither bus is energized, the relay 839 will remain deenergized and the transformer bank symbol will flash a red signal to indicate that the transformer bank is connected to the busses but is not being energized therefrom. From the explanation given, the operation of the remaining tell-tale indications shown in Figs. 6 to 8, inclusive, will be clear.

Relays 700, 701, 704, and 705 are used in the control circuits of the one-line diagram to provide means to compensate for the loss in current due to the resistance of the circuits which loop from one relay to another through the contacts on the notching relays, shown in Figs. 6 to 8, inclusive. These relays also assist in keeping the current down to a value which can be easily broken by the contacts used on the notching relays which are operated when the signalling circuits are set up on the dispatcher's control board. It will be seen that should all of the relays in a large dispatcher's control board system be connected through circuits in series and parallel as indicated on the drawings, Figs. 6 to 8, inclusive, and it should become necessary to break the energizing circuit of a large number of the relays with a small contact, such as is used in systems of this type, that the contact might not be able to carry the load with the result that the contact springs would burn up. By using sectionalizing relays, such as 700, 701, 704, and 705, this danger is eliminated. The operation of the relays 700 and 701 will be clearly understood from the description given in connection with the operation of the relays 704 and 705 which are identically connected in the circuit.

What I claim is:

1. In an arrangement of equipment for use in conjunction with a power distribution system, a display board illustrating by a one-line diagram and by numbered symbols, the network and apparatus and possible conditions of the apparatus of the power distribution system, dispatcher controlled means for changing any symbol to cause it to display any of a plurality of indications representing at least three possible conditions to which a switch of a power distribution system represented by it may be placed, and means automatically operated to change the display condition of other of said symbols representing equipment affected by a change in the condition of the selected symbol as necessary, to indicate the effect which would be produced on the represented system were such switch actually operated.

2. In a signalling system, a symbol representing a piece of switching apparatus having "tripped open", "closed", and "hold open" conditions, lamps associated with said symbol, circuits for said lamps, means for closing one or more of said circuits or for holding all said circuits open to cause said symbol to represent one of the conditions specified, means for closing at least another of said circuits to identify the symbol selected from other similar associated symbols, a plurality of said other symbols included in a one-line diagram in which the first symbol is included, and means controlled by the setting of the first symbol for modifying the condition of one or a plurality of said other symbols in a manner depending upon the particular setting of said first symbol.

3. In a signalling system, a symbol representing a multi-position circuit switching device, circuits and apparatus for causing said symbol to display indications representative of tripped open, closed, and hold open conditions of said switching device, means for operating said apparatus to automatically indicate on its symbol said respective indications in sequence so that the symbol may be readily identified, and means for then actuating said apparatus to indicate and retain any desired one of said specific switch conditions.

4. In a power supervisory system, a supervisory chart containing a transformer symbol, a generator symbol, and a one-line diagram connecting the two symbols including symbols of intermediate switches, means associated with the chart for illuminating said symbols, including means for automatically illuminating the transformer symbol steadily with a certain color whenever the generator symbol is illuminated to indicate its live condition and all intermediate switches are illuminated to indicate closed position, and for automatically flashing the transformer symbol whenever any of said switch symbols change to indicate open position and for automatically darkening the transformer symbol to indicate when it is cut out of service.

5. In a dispatcher's board for use in supervising the control of equipment of a system of power distribution, a chart containing symbols of two general classes of power equipment and also containing a one-line diagram interconnecting the symbols and being representative of the power conductors interconnecting the represented equipment of the power system, one or more lamps for each of said symbols, circuit switching devices individual to symbols of the first general class, means for selectively operating any one of said devices to cause one or the other of its associated lamps to be lighted continuously or intermittently or to extinguish either of the lamps, and circuits and apparatus controlled in accordance with each position of the device wherein one or the other of the lamps is lighted for causing the display condition of one or more symbols of the second class to change their indication accordingly, as the apparatus represented by them is affected.

6. In an equipment for use in connection with a power distribution system, a chart including a one-line diagram representing the power network, signals associated with said diagram representing the interconnected equipment therein, other signals, control circuits interconnecting said other signals, multiposition switching means, dispatcher controlled means for directively actuating said switching means to operate one of said first signals only, said other signals being operated over said control circuits, and means controlled by said switching means for closing points in said control circuits, when operating a directively controlled signal, to operate different combinations of said other signals to illustrate the effect in the power network which would be brought about by a change in the piece of equipment represented by the directively operated signals.

7. In a signalling system, a chart having a one-line diagram thereon, symbols associated with said diagram representing the apparatus and circuits of a system of electric power distribution, means controlled by a dispatcher for seizing and selectively changing the indication of certain of said symbols to indicate a corresponding change in the system, and means for automatically changing certain other of said symbols from one indication to another if the change in the seized symbol would cause an effect on the apparatus of the system represented by said other symbols, the new indication of said other symbols indicating the effect on the apparatus represented thereby which would result from a change in the apparatus corresponding to that indicated on the seized symbol.

THOMAS U. WHITE.